United States Patent
Lee et al.

(10) Patent No.: US 9,083,814 B2
(45) Date of Patent: Jul. 14, 2015

(54) BOUNCING ANIMATION OF A LOCK MODE SCREEN IN A MOBILE COMMUNICATION TERMINAL

(75) Inventors: Jungjoon Lee, Gyeonggi-Do (KR); Taehun Kim, Incheon (KR); Taekon Lee, Gyeonggi-Do (KR); Jeongyoon Rhee, Seoul (KR); Younhwa Choi, Seoul (KR); Minhun Kang, Seoul (KR); Hyunjoo Jeon, Daejeon (KR)

(73) Assignee: LG ELECTRONICS INC., Seoul (KR)

(*) Notice: Subject to any disclaimer, the term of this patent is extended or adjusted under 35 U.S.C. 154(b) by 29 days.

(21) Appl. No.: 12/904,081

(22) Filed: Oct. 13, 2010

(65) Prior Publication Data

US 2011/0028186 A1  Feb. 3, 2011

Related U.S. Application Data

(63) Continuation-in-part of application No. 12/245,692, filed on Oct. 3, 2008, now abandoned.

(30) Foreign Application Priority Data

Oct. 4, 2007 (KR) .................. 10-2007-0100025
Aug. 22, 2008 (KR) .................. 10-2008-0082511

(51) Int. Cl.
*G06F 3/048* (2013.01)
*H04M 1/725* (2006.01)
(Continued)

(52) U.S. Cl.
CPC ......... *H04M 1/72544* (2013.01); *G06F 3/0486* (2013.01); *G06F 3/04883* (2013.01); *G06T 13/00* (2013.01); *H04M 1/67* (2013.01); *H04M 2250/22* (2013.01)

(58) Field of Classification Search
CPC ..... G06F 1/3265; G06F 3/048; G06F 3/0484; G06F 1/3203; H04M 1/72544
USPC ................... 715/784, 863, 864, 768
See application file for complete search history.

(56) References Cited

U.S. PATENT DOCUMENTS 5,283,560 A   2/1994  Bartlett
5,305,435 A   4/1994  Bronson
(Continued)

FOREIGN PATENT DOCUMENTS

EP    1278116       1/2003
JP    2003-195998   7/2003
(Continued)

OTHER PUBLICATIONS

Korean Intellectual Property Office Application Serial No. 10-2007-0100025, Notice of Allowance dated Jan. 21, 2014, 2 pages.
(Continued)

*Primary Examiner* — Rashawn Tillery
(74) *Attorney, Agent, or Firm* — Lee, Hong, Degerman, Kang & Waimey

(57) ABSTRACT

Displaying a lock mode screen of a mobile terminal is disclosed. One embodiment of the present disclosure pertains to a mobile terminal comprising a display module, an input device configured to detect an input for triggering a bouncing animation of a lock mode screen, and a controller configured to cause the display module to display the bouncing animation in response to the input for triggering the bouncing animation, where the bouncing animation comprises the lock mode screen bouncing for a set number of times with respect to an edge of the display module prior to stabilization.

26 Claims, 23 Drawing Sheets

(51) Int. Cl.
  *G06F 3/0486* (2013.01)
  *G06F 3/0488* (2013.01)
  *G06T 13/00* (2011.01)
  *H04M 1/67* (2006.01)

(56) References Cited

U.S. PATENT DOCUMENTS

| | | | |
|---|---|---|---|
| 5,586,244 A | 12/1996 | Berry et al. | |
| 5,677,708 A | 10/1997 | Matthews et al. | |
| 6,727,917 B1 | 4/2004 | Chew et al. | |
| 7,246,329 B1 | 7/2007 | Miura et al. | |
| 7,388,578 B2 | 6/2008 | Tao | |
| 2003/0038821 A1 | 2/2003 | Kraft | |
| 2003/0063090 A1* | 4/2003 | Kraft et al. | 345/475 |
| 2004/0032434 A1* | 2/2004 | Pinsky et al. | 345/814 |
| 2005/0079896 A1* | 4/2005 | Kokko et al. | 455/566 |
| 2005/0253817 A1* | 11/2005 | Rytivaara et al. | 345/173 |
| 2005/0275633 A1* | 12/2005 | Varanda | 345/173 |
| 2006/0055662 A1 | 3/2006 | Rimas-Ribikauskas et al. | |
| 2006/0242607 A1 | 10/2006 | Hudson | |
| 2007/0126748 A1* | 6/2007 | Jeffrey et al. | 345/559 |
| 2007/0150842 A1 | 6/2007 | Chaudhri et al. | |
| 2007/0185608 A1 | 8/2007 | Ragnini | |
| 2008/0052945 A1 | 3/2008 | Matas et al. | |
| 2008/0057926 A1 | 3/2008 | Forstall et al. | |
| 2008/0163119 A1 | 7/2008 | Kim et al. | |
| 2008/0201649 A1* | 8/2008 | Mattila et al. | 715/763 |
| 2009/0241072 A1* | 9/2009 | Chaudhri et al. | 715/863 |
| 2009/0259969 A1* | 10/2009 | Pallakoff | 715/808 |
| 2009/0328169 A1* | 12/2009 | Hutchison et al. | 726/7 |
| 2010/0306693 A1* | 12/2010 | Brinda | 715/784 |
| 2011/0083099 A1* | 4/2011 | Eun | 715/786 |
| 2011/0090255 A1* | 4/2011 | Wilson et al. | 345/647 |
| 2011/0109538 A1* | 5/2011 | Kerr et al. | 345/156 |
| 2011/0161849 A1* | 6/2011 | Stallings et al. | 715/768 |
| 2011/0242007 A1* | 10/2011 | Gray et al. | 345/173 |

FOREIGN PATENT DOCUMENTS

| | | |
|---|---|---|
| KR | 1020060112112 | 10/2006 |
| KR | 1020070062911 | 6/2007 |

OTHER PUBLICATIONS

Korean Intellectual Property Office Application Serial No. 10-2008-0082511, Office Action dated Jan. 28, 2015, 4 Pages.

* cited by examiner (a)  (b)

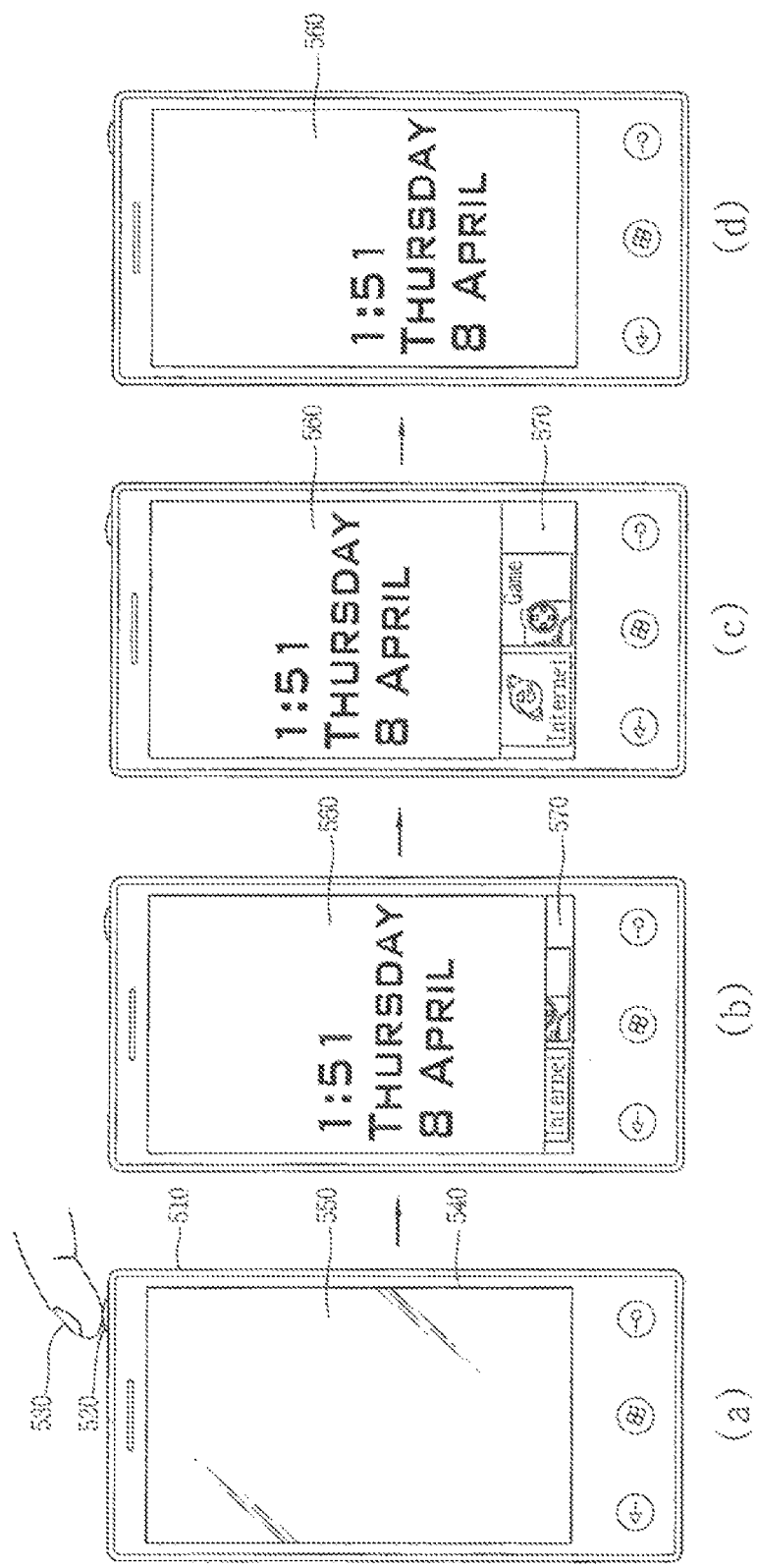

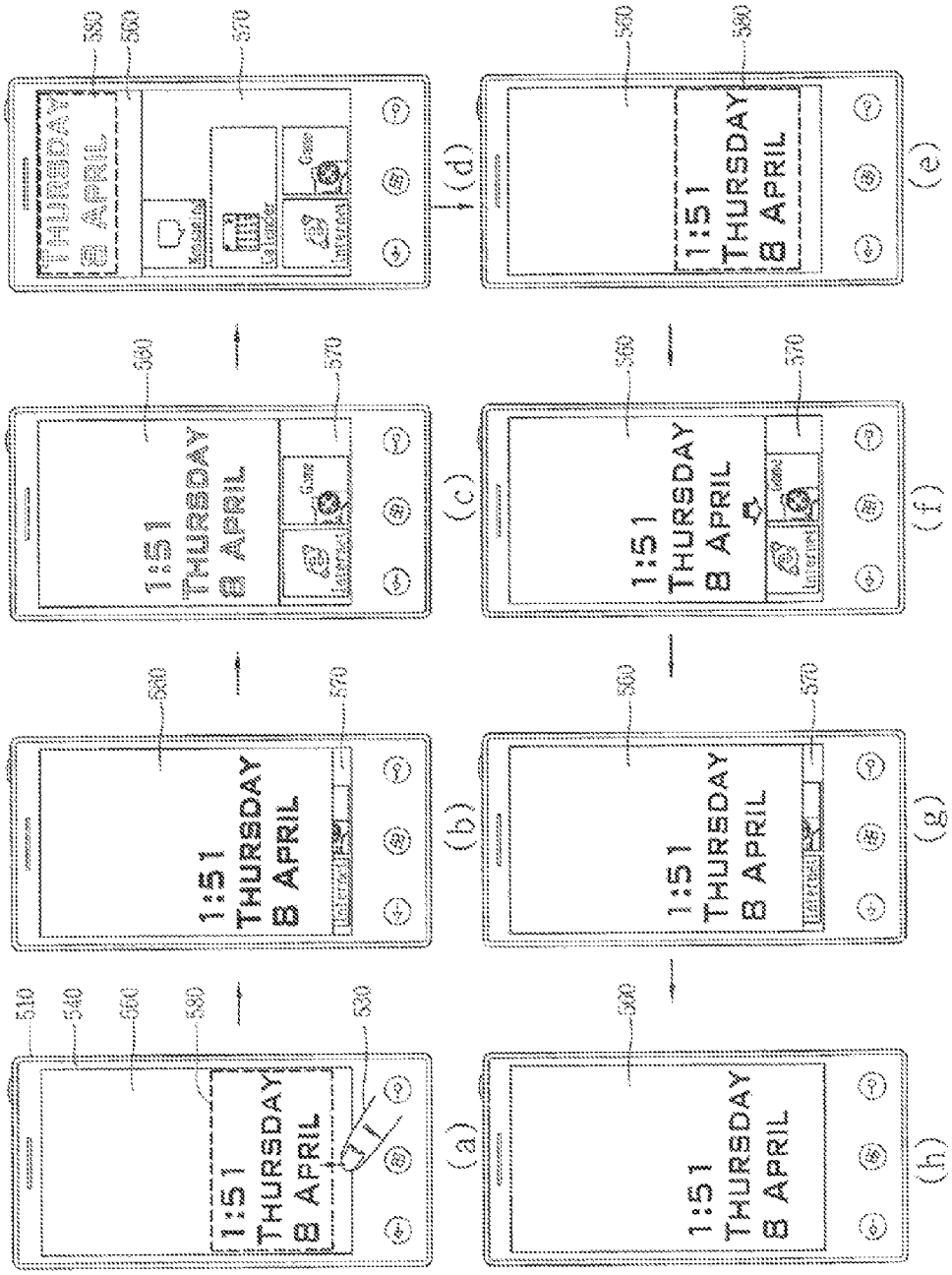

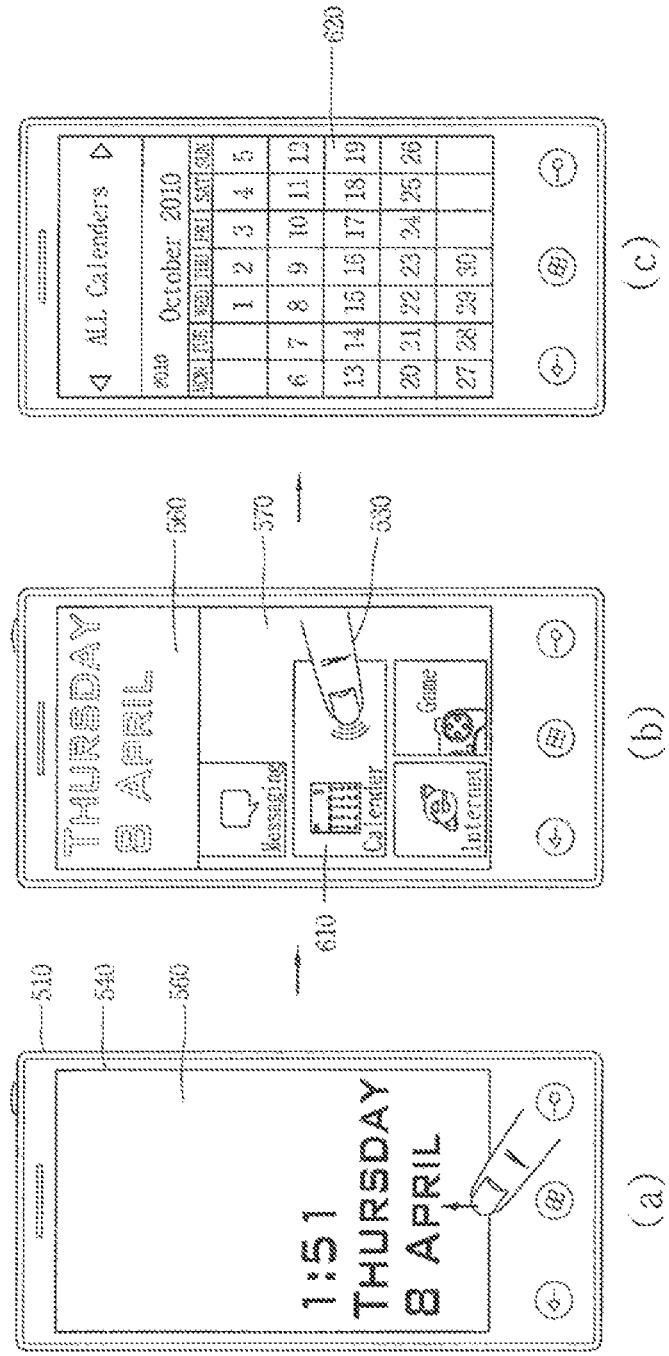

BOUNCING ANIMATION OF A LOCK MODE SCREEN IN A MOBILE COMMUNICATION TERMINAL

CROSS-REFERENCE TO RELATED APPLICATIONS

This is a continuation-in-part application of U.S. patent application Ser. No. 12/245,692, filed on Oct. 3, 2008 , now abandoned, which claims the benefit of earlier filing date and right of priority to Korean Patent Application No. 10-2007-0100025 filed on Oct. 4, 2007 and Korean Patent Application No. 10-2008-0082511 filed on Aug. 22, 2008, the contents of which are all hereby incorporated by reference herein in the entirety.

TECHNICAL FIELD

The present disclosure relates to a method for displaying a lock mode screen, and an apparatus implementing the same.

BACKGROUND

Mobile terminals are devices which may be configured to perform various functions. Examples of such functions include data and voice communications, capturing images and video via a camera, recording audio, playing music files via a speaker system, and displaying images and videos on a display unit. Some mobile terminals include additional functionalities which support online games, multimedia players, etc. More recently, some mobile terminals have been configured to receive broadcast and multicast signals which permit viewing of contents such as videos and television programs.

Efforts are ongoing to support and increase the functionalities of mobile terminals. Such efforts include software and hardware innovations. For example, a user interface environment is provided to allow a user to easily and conveniently search or select functions available on mobile terminals, where the user interface environment may refer to graphical, textual and auditory information a program presents to the user, and the control sequences (e.g., keystrokes with a keyboard of the mobile terminals, movements of a mouse of the mobile terminals, or selections with a touch screen of the mobile terminals) the user employs to control the program. Thus, the user interface environment makes it easy, efficient, and enjoyable to operate mobile terminals.

SUMMARY

To achieve these and other objectives and in accordance with the purpose of the present disclosure, as embodied and broadly described herein, the present disclosure provides in one aspect a mobile terminal comprising a display module, an input device configured to detect an input for triggering a bouncing animation of a lock mode screen, and a controller configured to cause the display module to display the bouncing animation in response to the input for triggering the bouncing animation, where the bouncing animation comprises the lock mode screen bouncing for a set number of times with respect to an edge of the display module prior to stabilization.

To achieve these and other advantages and in accordance with the purpose of the present disclosure, as embodied and broadly described herein, the present disclosure provides in another aspect a method for displaying a lock mode screen of a mobile terminal. The method comprises detecting an input applied to an input device of the mobile terminal. The method further comprises displaying on a display module of the mobile terminal a bouncing animation of a lock mode screen if the input is configured for triggering the bouncing animation of the lock mode screen, where the bouncing animation comprises the lock mode screen bouncing for a set number of times with respect to an edge of the display module prior to stabilization.

Further scope of applicability of the present disclosure will become apparent from the detailed description given hereinafter. However, it should be understood that the detailed description and specific examples, while indicating preferred embodiments of the disclosed mobile terminal and method, are given by illustration, since various changes and modifications within the spirit and scope of the disclosed mobile terminal and method will become apparent to those skilled in the art from this detailed description.

BRIEF DESCRIPTION OF THE DRAWINGS

The present disclosure will become more fully understood from the detailed description given below and the accompanying drawings, which are given by illustration, and thus are not limitative of the present disclosure.

FIGS. 11A and 11B are exemplary views for executing an application during a lock mode of a mobile terminal according to one embodiment.

Reference will now be made in detail to the preferred embodiments of the present disclosure, examples of which are illustrated in the accompanying drawings. If a detailed explanation for a related known function or construction is considered to unnecessarily divert the gist of the present disclosure, such explanation has been omitted but would be understood by those skilled in the art. In describing the

DETAILED DESCRIPTION OF EXAMPLE EMBODIMENTS

Figure 1:
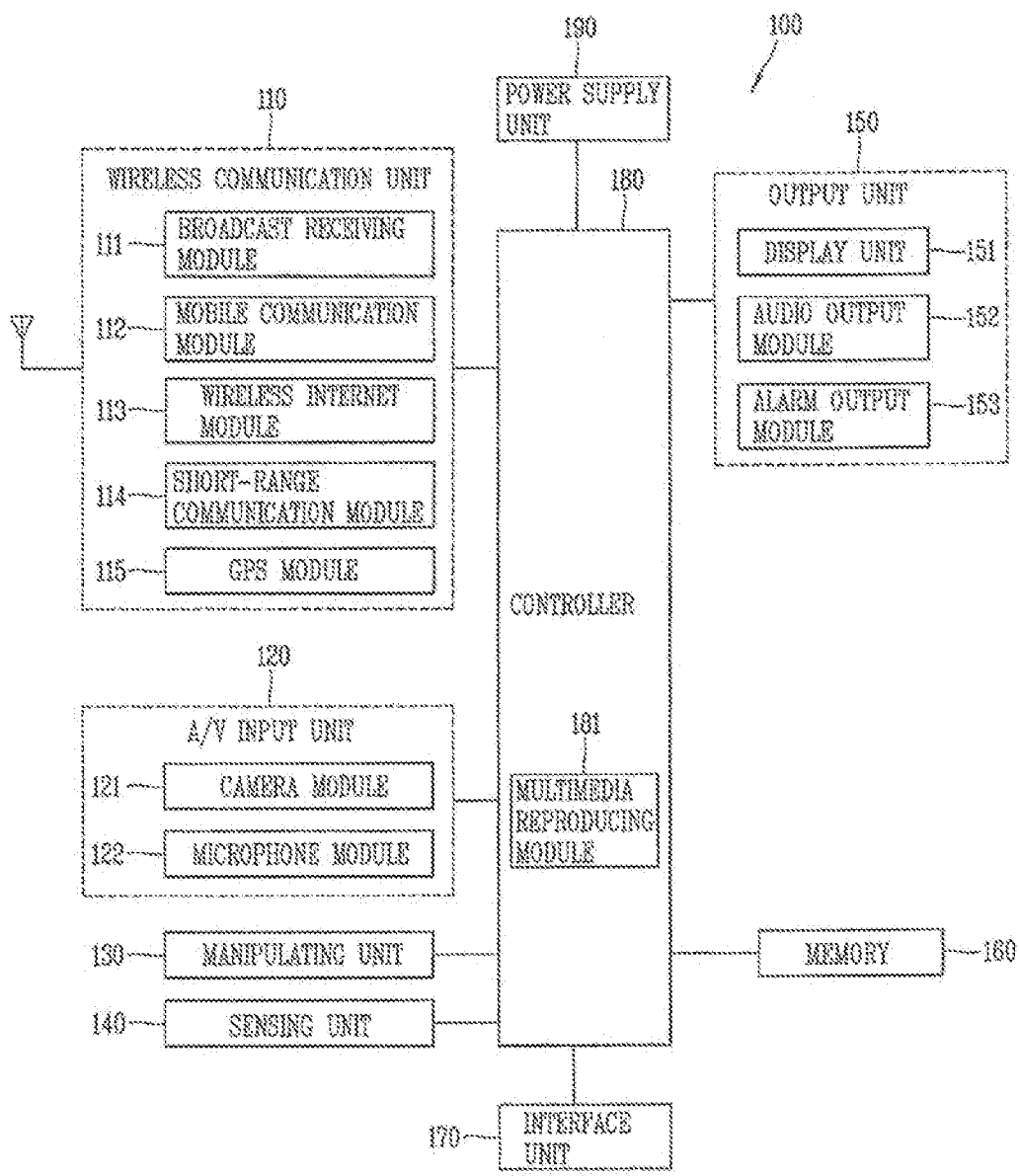
FIG. 1 is a schematic block diagram of a mobile terminal according to one embodiment.

Referring to FIG. 1, a mobile terminal 100 according to one embodiment, may be implemented in various configurations or form factors. Examples of such terminals include mobile phones, smart phones, notebook computers, navigation devices, digital broadcast terminals, personal digital assistants (PDAs), or portable multimedia players (PMP). The mobile terminal 100 may include a wireless communication unit 110, an A/V (Audio/Video) input unit 120, a manipulating unit 130, a sensing unit 140, an output unit 150, a storage unit 160, an interface unit 170, a controller 180, and a power supply unit 190, etc. Greater or fewer components may alternatively be implemented.

For example, the wireless communication unit 110 may include a broadcast receiving module 111, a mobile communication module 112, a wireless Internet module 113, a short-range communication module 114, and a GPS module 115. The broadcast receiving module 111 receives a broadcast signal and/or broadcast associated information from an external broadcast management server via a broadcast channel. The broadcast channel may include a satellite channel and a terrestrial channel. The broadcast managing server may refer to a system that generates and transmits a broadcast signal and/or broadcast associated information or a server that receives a previously generated broadcast signal and/or broadcast associated information and transmits the same to a terminal.

Examples of the broadcast associated information may include information regarding a broadcast channel, a broadcast program, a broadcast service provider, etc. The broadcast signal may include a TV broadcast signal, a radio broadcast signal, and a data broadcast signal, among others. If desired, the broadcast signal may further include a broadcast signal combined with a TV or radio broadcast signal. The broadcast associated information may be provided also via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), etc.

The broadcast receiving module 111 may be configured to receive broadcast signals by using various types of broadcast systems. In particular, the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link (MediaFLO®), integrated services digital broadcast-terrestrial (ISDB-T), etc. The broadcast receiving module 111 is configured to be suitable for every broadcast system that provides a broadcast signal as well as the above-mentioned digital broadcast systems. Broadcast signal and/or broadcast-associated information received via the broadcast receiving module 111 may be stored in the storage unit 160.

The mobile communication module 112 transmits/receives radio signals to/from at least one of a base station, an external terminal and a server in a mobile communication network. Such radio signals may include a voice call signal, a video call signal or various types of data according to text/multimedia message transmission/reception. The wireless Internet module 113 supports Internet access for the mobile terminal 100, and may be internally or externally coupled to the mobile terminal 100. The short-range communication module 114 refers to a module for supporting short range communications. Some examples of short-range communication technology include Bluetooth™, Radio Frequency IDentification (RFID), Infrared Data Association (IrDA), Ultra-WideBand (UWB), ZigBee™, and the functional or structural equivalents.

The GPS module 115 is a module receives location information from a plurality of artificial satellites. A/V input unit 120 is configured to input an audio or video signal. The A/V input unit 120 may include a camera module 121 and a microphone module 122. The camera module 121 processes image frames of still pictures or videos obtained by an image sensor in a video capturing mode or an image capturing mode. The processed image frames may be displayed on a display module 151. The image frames processed by the camera module 121 may be stored in the memory 160 or transmitted via the wireless communication unit 110. Two or more camera modules 121 may be provided according to the configuration of the mobile terminal 100.

The microphone module 122 may receive sounds (e.g., audible data) via a microphone in a phone call mode, a recording mode, a voice recognition mode, and the like, and process it into electrical voice data. The processed audio (voice) data may be converted for output into a format transmittable to a mobile communication base station via the mobile communication module 112 in case of the phone call mode. The microphone module 122 may include various types of noise canceling (or suppression) algorithms to cancel (or suppress) noise generated in the course of receiving and transmitting audio signals.

The manipulating unit 130 may generate key input data inputted by a user to control various operations of the mobile terminal 100. The manipulating unit 130 may include a keypad, a dome switch, a touch pad (e.g., a touch sensitive member that detects changes in resistance, pressure, capacitance, etc.), a jog wheel, a jog switch, and the like. In particular, when the touch pad is overlaid on the display module 151 in a layered manner, it may be called a touch screen.

The sensing unit 140 detects a current status (or state) of the mobile terminal 100 such as an open/close state of the mobile terminal 100, a location of the mobile terminal 100, a presence or absence of user contact with the mobile terminal 100, and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile terminal 100. For example, the external devices may include wired/wireless headset ports, external power charger ports, wired/wireless data ports, memory card ports, ports for connecting a device having an identification module (e.g., SIM/UIM/UICC card), audio input/output (I/O) ports, video I/O ports, earphone ports, or the like. The interface unit 170 may be used to receive inputs (e.g., data, information, power, etc.) from an external device and transfer the received inputs to one or more elements within the mobile terminal 100 or may be used to transfer data from the mobile terminal 100 to an external device.

The output unit 150 is configured to output an audio signal, a video signal or an alarm signal. The output unit 150 may include the display module 151, an audio output module 152, an alarm output module 153, and the like. The display module 151 may output information processed in the mobile terminal 100. For example, when the mobile terminal 100 is in the phone call mode, the display unit 151 may display a User Interface (UI) or a Graphic User Interface (GUI) associated with a call or other communication. When the mobile terminal 100 is in the video call mode or the image capturing mode, the display unit 151 may display a captured and/or received image, a UI, a GUI, and the like.

When the display module 151 and the touch pad are overlaid in a layered manner to form a touch screen, the display module 151 may function as both an input device and an output device. The display module 151 may include at least one of a Liquid Crystal Display (LCD), a Thin Film Transistor-LCD (TFT-LCD), an Organic Light Emitting Diode (OLED), a flexible display, a three-dimensional (3D) display, for example. The mobile terminal 100 may include two or more display modules (or other display means) according to its embodiment. For example, the mobile terminal 100 may include an external display unit (not shown) and an internal display unit (not shown).

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer, or the like. The alarm output module 153 may provide outputs to inform about an occurrence of an event of the mobile terminal 100. Typical events may include a call signal reception, a message reception, a key signal input, etc. In addition to audio or video outputs, the alarm output module 153 may provide outputs in a different manner to inform about an occurrence of an event.

For example, the alarm output module 153 may provide outputs in the form of vibrations (or other tactile means). When a call signal, a message, or some other incoming communication is received, the alarm output module 153 may provide tactile outputs (i.e., vibrations) to inform the user. By providing tactile outputs, the user can recognize the occurrence of various events. Outputs informing about the occurrence of an event may be also provided via the display unit 151 or the audio output module 152. The storage unit 160 may store software programs or the like used for the processing and controlling performed by the controller 180, or may temporarily store inputted/outputted data (e.g., a phonebook, messages, still images, video, etc.).

The storage unit 160 may include at least one type of storage medium including a flash memory type, a hard disk type, a multimedia card type, a card-type memory (e.g., SD or DX memory, etc), a Random Access Memory (RAM), a Static Random Access Memory (SRAM), a Read-Only Memory (ROM), and the like. Also, the mobile terminal 100 may cooperate with a network storage device that performs the storage function of the memory 160 over a network connection. The controller 180 typically controls the general operations of the mobile terminal 100. For example, the controller 180 performs controlling and processing associated with voice calls, data communications, video calls, and the like. In addition, the controller 180 may include a multimedia reproducing module 181 for reproducing (or playing back) multimedia data. The multimedia reproducing module 181 may be configured within the controller 180 or may be configured to be separated from the controller 180.

The power supply unit 190 receives external or internal power and supplies power required for the operations of the respective elements under the control of the controller 180. So far, the mobile terminal 100 has been described from the perspective of the functions. Hereinafter, external elements of the mobile terminal 100 will be described from the perspective of their functions with reference to FIGS. 2 and 3. Mobile terminal 100 may be implemented in a variety of different configurations. Examples of such configurations include folder-type, bar-type, swing-type and slide type combinations thereof. For clarity, further disclosure will primarily relate to the slide-type mobile terminal 100. However such teachings apply equally to other types of terminals.

Figure 2:
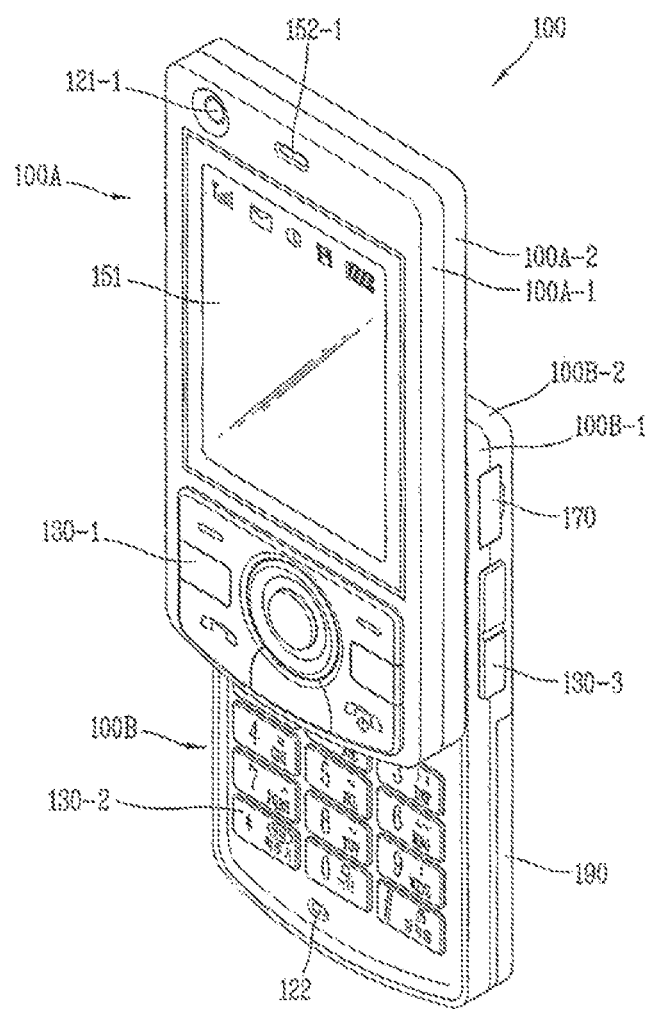
FIG. 2 is a front perspective view of the mobile terminal according to one embodiment.

FIG. 2 is a front perspective view of the mobile terminal 100 according to one embodiment. The slide type mobile terminal 100 may comprise a first body 100A, and a second body 100B configured to be slidably moved in at least one direction with respect to the first body 100A. A state in which the first body 100A is disposed to overlap with the second body 100B may be called a closed configuration, and as shown in FIG. 2, a state in which the first body 100A exposes at least a portion of the second body 100B may be called an open configuration. The mobile terminal 100 may usually operate in a standby mode in the closed configuration, but this mode can be released by the user. Also, the mobile terminal 100 may mainly function in a call mode in the open configuration, but may be changed to the standby mode according to user manipulation or after the lapse of a certain time.

At least one case (housing, casing, cover, etc.) constituting the external appearance of the first body 100A comprises a first front case 100A-1 and a first rear case 100A-2. Various electronic components may be installed inside the first front case 100A-1 and the first rear case 100A-2. One or more intermediate cases may be additionally disposed between the first front case 100A-1 and the first rear case 100A-2. The case can be formed by injection-molding a synthetic resin, or made of a metallic material such as stainless steel (STS) or titanium (Ti), or some other appropriate material. The display module 151, a first audio output module 152-1, a first camera module 121-1 or a first manipulating unit 130-1 may be located on the first front case 100A-1 of the first body 100A. The display module 151 may include LCD, OLED, and the like, that visually displays information. A touch pad may be overlaid in a layered manner on the display module 151 to allow the display module 151 to function as a touch screen to input information.

The first audio output module 152-1 may be implemented as a receiver or a speaker. The first camera module 121-1 may be implemented to be suitable for a user to capture still images or video of a user and so on. The first manipulating unit 130-1 receives a command for recording or capturing an image of call communication. Like the first body 100A, a case constituting the external appearance of the second body 100B may be formed by a second front case 100B-1 and a second rear case 100B-2. A second manipulating unit 130-2 may be disposed at the second body 100B, specifically, on a front face of the second front case 100B-1.

A third manipulating unit 130-3, the microphone module 122 and the interface unit 170 may be disposed at either the second front case 100B-1 or the second rear case 100B-2. The first to third manipulating units 130-1, 130-2 and 130-3 may be called a manipulating portion 130, and various methods can be employed for the manipulating portion 130 so long as it can be operated by the user in a tactile manner. The manipulating portion 130 can be implemented as a dome switch or touch pad that can receive user commands or information according to pushing or touching, or implemented in the form of a wheel, a jog element, a joystick, or the like to allow user manipulation thereof.

In terms of its functions, the first manipulating unit 130-1 is used for inputting commands such as start, end, scroll or the like, and the second manipulating unit 130-2 is used for inputting numbers, characters, symbols, or the like. The third manipulating unit 130-3 can be operated to support a so-called hot key function (e.g., speed dialing, dedicated key inputs, etc.) for activating a special function of the mobile terminal 100. The microphone module 122 may be implemented to be suitable for receiving the user's voice and other various sounds. The interface unit 170 may be used as a link (passage or path) through which the mobile terminal 100 can exchange data or the like with an external device.

For example, the interface unit 170 may be implemented as one of a connection port for connecting an earphone to the mobile terminal 100 via a fixed or wireless means, a port for short-range communications (e.g., an Infrared Data Association (IrDA) port, a Bluetooth™ port, a wireless LAN port, etc.), or power supply ports for providing power to each element. The interface unit 170 has been described, so its detailed description will be omitted. The power supply unit 190 for supplying power to the mobile terminal 100 is located at the side portion of the second rear case 100B-2. The power supply unit 190 may be, for example, a rechargeable battery that can be detached.

Figure 3:
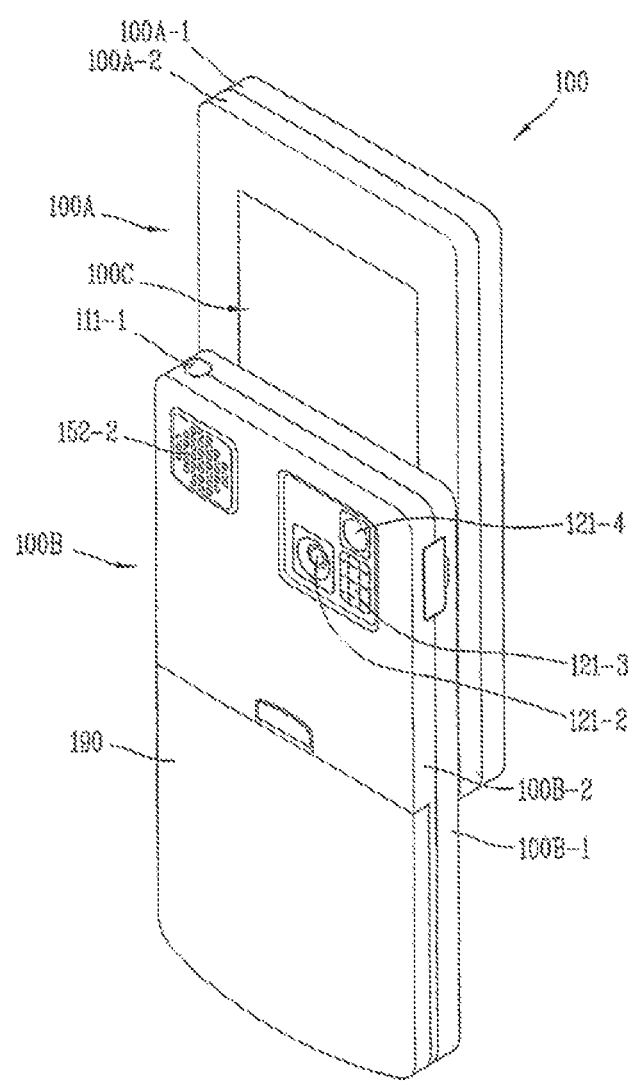
FIG. 3 is a rear view of the mobile terminal in FIG. 2.

FIG. 3 is a rear view of the mobile terminal 100 according to an exemplary embodiment. With reference to FIG. 3, a second camera module 121-2 may additionally be disposed on a rear surface of the second rear case 100B-2 of the second body 100B. The second camera module 121-2 may have an image capture direction which is substantially the opposite to that of the first camera module 121-1 (see FIG. 1), and may support a different number of pixels as that of the first camera module 121-1.

For example, the first camera module 121-1 may be used for low resolution (i.e., supporting a relatively small number of pixels) to quickly capture an image (or video) of the user's face and immediately transmit the same to the other party during video conferencing or the like. Meanwhile, the second camera module 121-2 may be used for high resolution (i.e., supporting a relatively large number of pixels) in order to capture more detailed (higher quality) images (or video) which typically do not need to be transmitted immediately.

A flash 121-3 and a mirror 121-4 may be additionally disposed adjacent to the second camera module 121-2. When an image of the subject is captured with the second camera module 121-2, the flash 121-3 illuminates the subject. The mirror 121-4 allows the user to see himself when he wants to capture his own image (self-image capturing) by using the second camera module 121-2. The second rear case 100B-2 may further include a second audio output module 152-2. The second audio output module 152-2 may implement a stereophonic sound function in conjunction with the first audio output module 152-1 (See FIG. 2), and may be also used for sending and receiving calls in a speaker phone mode.

Figure 4:
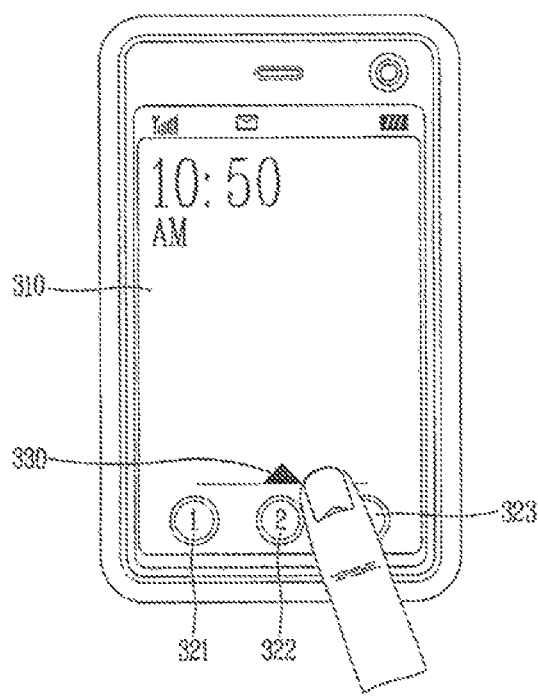
FIG. 4 shows a background screen image of the mobile terminal according to one embodiment.

A broadcast signal receiving antenna 111-1 may be disposed at one side or region of the second rear case 100B-2, in addition to an antenna that supports mobile communications. The antenna 111-1 can be configured to be retractable from the second body 100B-2. One part of a slide module 100C that slidably combines the first body 100A and the second body 100B may be disposed on the first rear case 100A-2 of the first body 100A. The other part of the slide module 100C may be disposed on the second front case 100B-1 of the second body 100B, which may not be exposed as shown in FIG. 4. In the above description, the second camera module 121-2 and so on is disposed on the second body 100B, but such configuration is not meant to be limited.

For example, one or more of the elements (e.g., 111-1, 121-2, 121-3, 152-2, etc.), which are disposed on the second rear case 100B-2 in the above description, may be mounted on the first body 100A, mainly, on the first rear case 100A-2. In this case, those elements disposed on the first rear case 100A-2 can be protected (or covered) by the second body 100B in the closed configuration. In addition, even if the second camera module 121-2 is not provided, the first camera module 121-1 may be configured to rotate (or otherwise be moved) to thus allow image capturing in various directions.

FIG. 4 shows a background screen image of the mobile terminal 100 according to one embodiment. As shown, the mobile terminal 100 may not display any menu item on a background image 310 in a standby mode or may simply display some menu items 321~323. A tag 330 related to a menu display may be displayed to allow the user to touch the tag 330 to drag it in a certain direction to expose the other remaining menu items that are usually hidden. A tag may be graphical user interface (GUI) object associated with a functional interface which allows a user to expose or hide from view other GUI objects on the mobile terminal 100's display.

In some embodiments, the tag 330 may not be displayed, and the user may touch one portion of the menu screen image 320 instead of the tag 330 so as to drag the menu screen image 320. Namely, one portion of the menu screen image 320 may be dragged to expose or hide the menu screen image. The method for allowing the menu screen image 320 to appear by dragging a tag 330 will now be described. The menu screen image 320 refers to a screen with menu items that appear from or are hidden in the background image 310.

The tag 330 may be displayed in a shape (e.g., an arrow) indicating a direction in which the menu screen image 320 is exposed or a direction in which the tag 330 can be dragged. For example, the tag 330 may have a triangular shape or an arrow shape. Accordingly, the tag 330 may be displayed by changing its direction according to whether the menu screen image 320 is exposed or hidden from view. The menu item displayed on the background screen image 310 may include an icon for executing a program. In addition, the menu item may include a 'group menu item' 430 for retrieving a menu item of a different group and displaying it on the background screen.

Figure 7A:
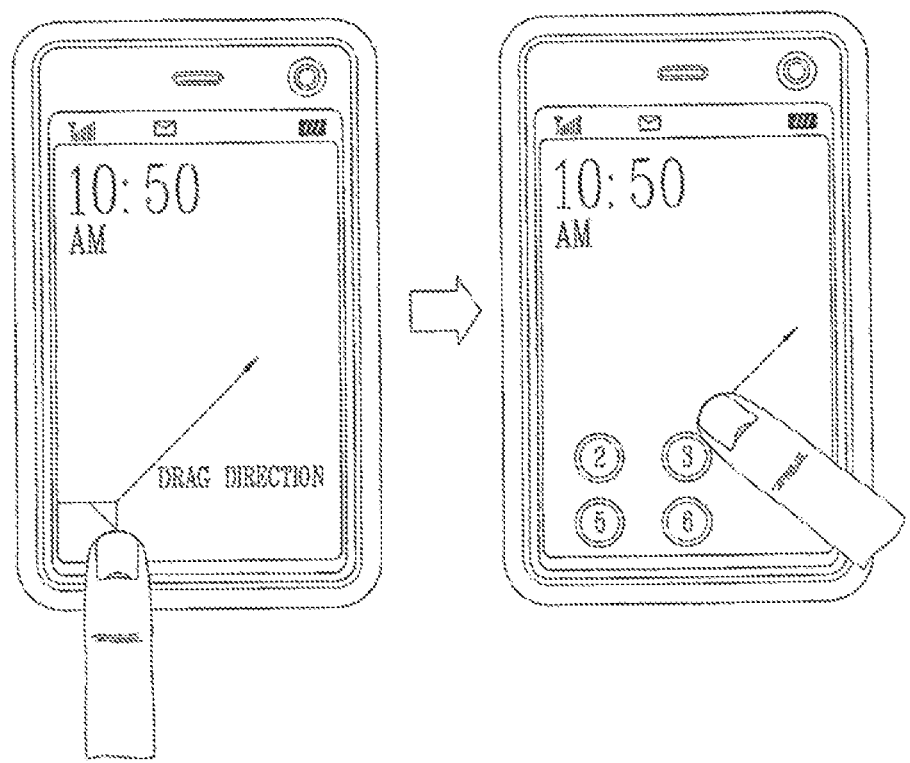
FIG. 7A shows a first example of displaying a menu screen by dragging a tag in FIG. 6B.
Figure 7B:
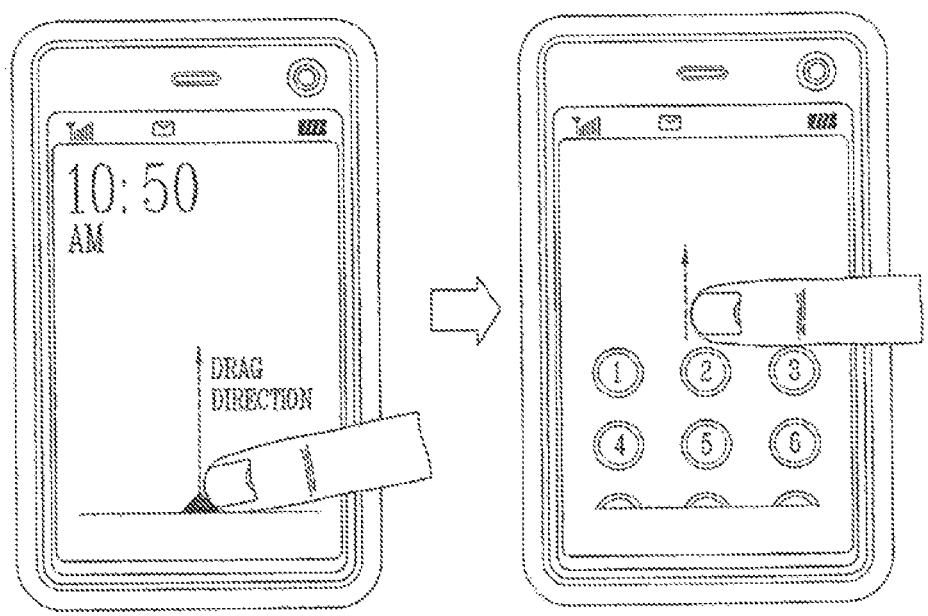
FIG. 7B shows a second example of displaying a menu screen by dragging a tag in FIG. 6B.
Figure 7C:
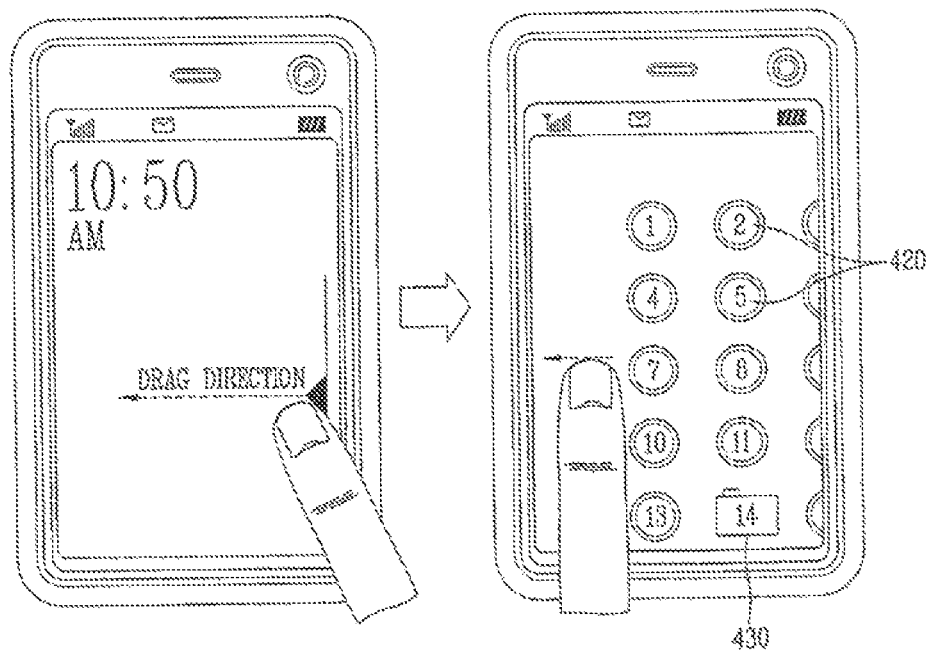
FIG. 7C shows a third example of displaying a menu screen by dragging a tag in FIG. 6B.

As shown in FIG. 7C, a 'group menu item' 430 may be displayed in the shape that can be discriminated from the menu item for executing the program. However, it may not be limited to the shape as shown in FIG. 7C. Menu screen image 320, which refers to a screen image including a plurality of menu items (or icons), is visually distinguished from the background screen image(s) 310 and may be translucent (i.e., semi-transparent) to allow the background screen image(s) 310 to be seen there through. In this case, an environment setting menu may be provided to allow the degree of transparency of the menu screen to be adjusted.

The menu screen image 320 may expose some of the menu items while hiding other items according to the distance along which the tag 330 is dragged. Namely, some of the menu items may be displayed while others may not be displayed according to the drag distance. Also, the controller 180 may determine the type of touch that was or is being performed when the user touches or releases the tag (icon) 330 based upon at least one of the number of touches, a contact time, contact speed, contact direction, contact pressure and contact surface area, or any combination thereof.

The type of touch may include pushing or pulling (or otherwise moving) the tag 330 or icon on the screen in an upward, downward or some other direction in a rather abrupt movement, which may be referred to as "flicking" because the movement, in one embodiment, may be compared to the motion associated with flicking a page of a book, for example. When the tag 330 is flicked in such a manner, the entire menu screen image 320 can be automatically shown (or exposed) or hidden such that the image appears to be unfolding on the screen without having to drag the entire menu screen image 320 all the way across the screen.

The respective menu items displayed on the menu screen image 320 may be indicated by icons of certain shapes or images. The menu items may be arranged in an arbitrary format by combining rows and columns or may be arranged randomly by disregarding rows and columns. The menu screen image 320 may be shown at or be hidden from a particular region of the screen, by setting at least one of a side portion, a corner portion, or a central portion of the touch screen as a boundary region from which the menu screen image 320 can appear or disappear, and the tag 330 (or other graphical indicator) can be used to indicate the boundary region.

Figure 5:
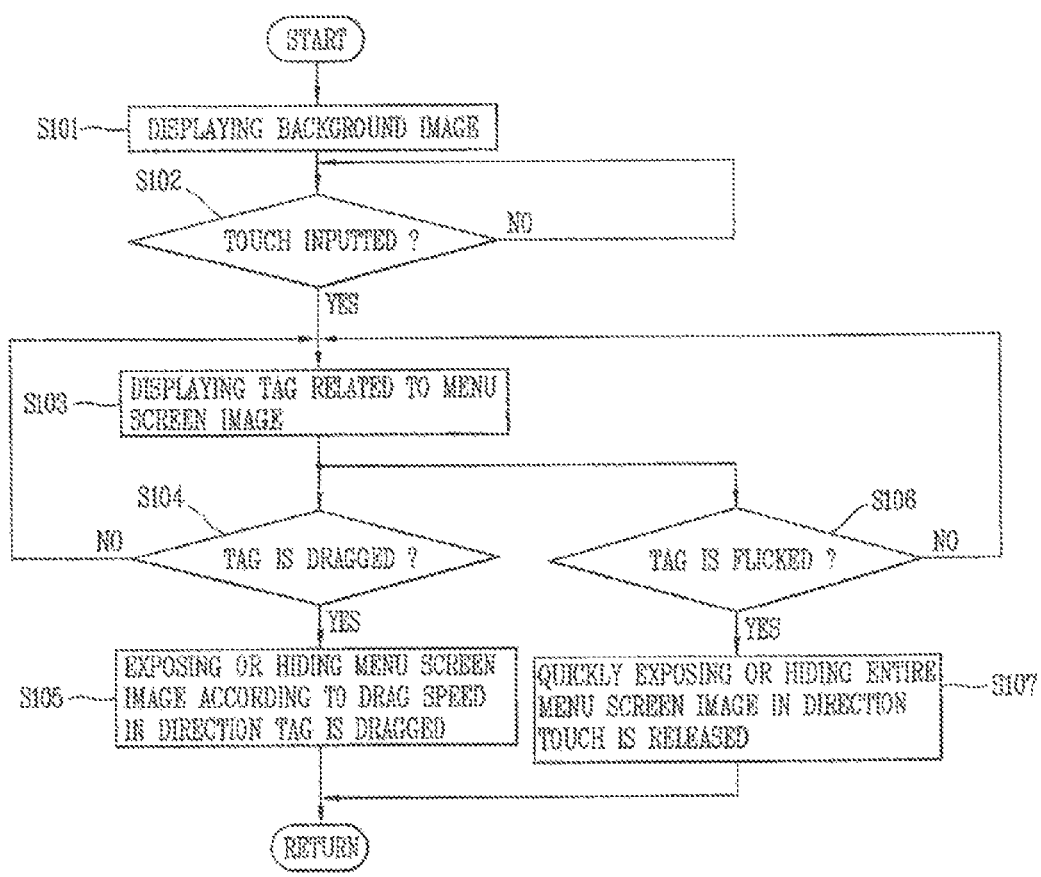
FIG. 5 is a flow chart illustrating the process of displaying a menu of the mobile terminal according to one embodiment.
Figure 6A:
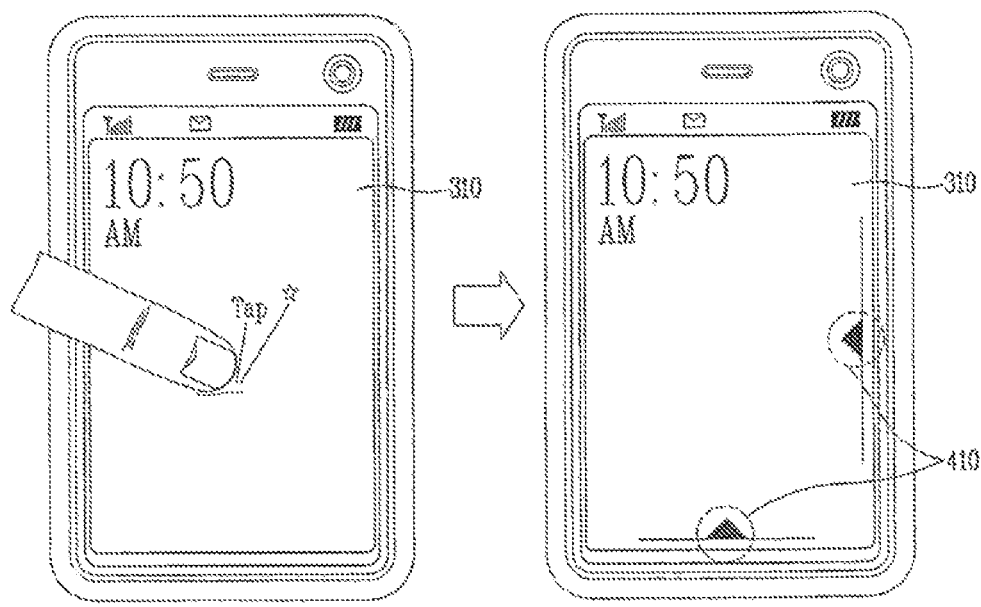
FIG. 6A is a view showing a method for calling a tag related to a menu in FIG. 5.

FIG. 5 is a flow chart illustrating the process of displaying a menu of the mobile terminal 100 according to one embodiment. The method of display process of the mobile terminal 100 according to the present disclosure will now be described with reference to FIGS. 5, 6A, 6B, 7A, 7B, 7C and 8. For the sake of example, it is assumed that no menu item is displayed on the background screen image 310 of the mobile terminal 100. As shown in FIG. 6A, if there is nothing displayed on the background screen image 310 with respect to a menu item, the user may touch the background screen image 310 to display tags 410 to display a menu screen image 320. That is, when a touch is inputted with nothing displayed on the background screen image 310, the tags 410 related to the menu screen image 320 are displayed (S101 to S103).

Figure 6B:
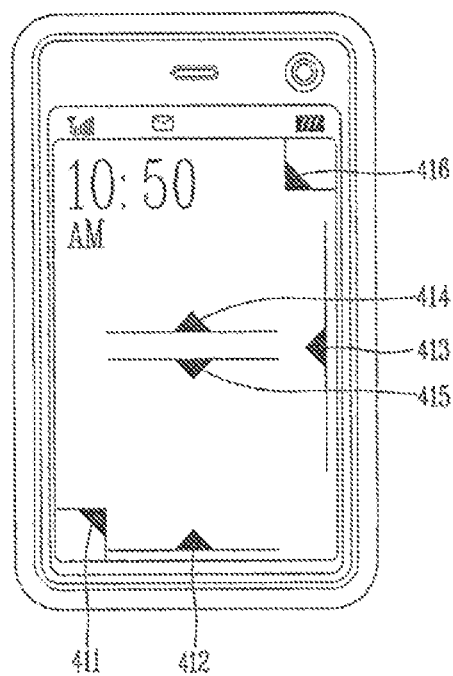
FIG. 6B is a view showing various positions of tags called in FIG. 6A.

As shown in FIG. 6B, one or more tags 411 to 416 may be displayed, and the tags 410 may be displayed at one of a side, a corner or an internal region of the touch screen. If a tag related to the menu display is already displayed on the background screen image 310, the tag calling process may be omitted. After the tag is displayed, if there is no dragging or flicking during a pre-set time, the displayed tag may be released. With the tags 410 displayed, when the user touches one of the tags 410 and drags it (S104), the controller 180 exposes a menu screen image 320, which has been hidden, in the direction in which the tag is dragged as shown in FIGS. 7A to 7C. Likewise, if the tag is dragged in a different direction, an exposed menu screen image 320 may be hidden (S105).

The menu items displayed on the menu screen image 320 may include a group menu item 430 indicating a menu item included in a different menu group, and it may be displayed to be different from the menu items 420 for executing a program. If tag dragging is stopped before the entire menu screen image 320 is exposed, or when the touch to the tag being dragged is released, the menu screen maintains a currently exposed state as it is. That is, while flicking results in exposing or hiding the entire menu screen image 320, dragging allows adjusting of the degree of exposing or hiding of the menu screen image 320 in accordance with the speed and direction of the dragging motion.

Figure 8:
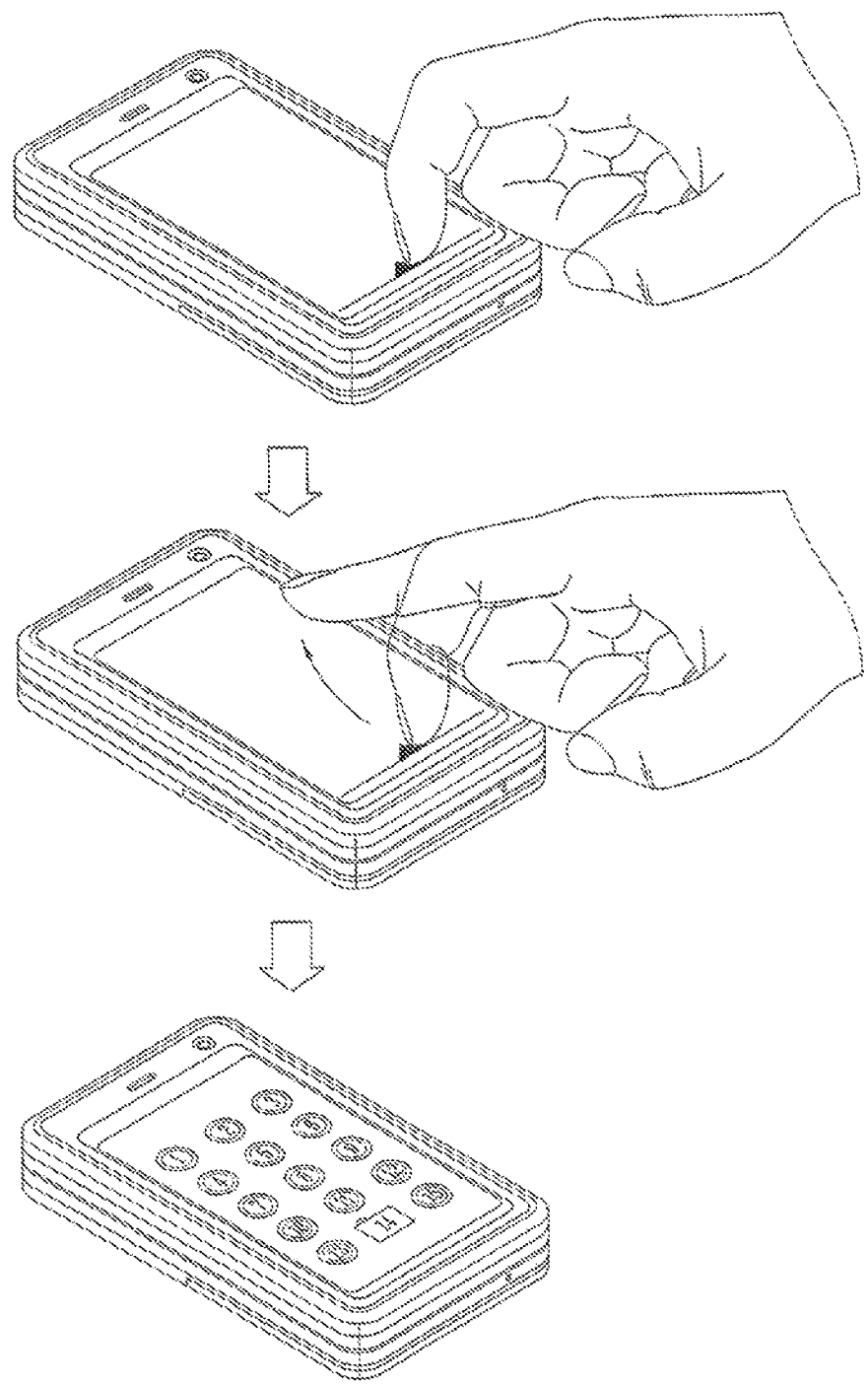
FIG. 8 is a view showing a method for displaying a menu screen according to a touch format of a tag in FIG. 6B.

Notably, referring back for FIG. 5, if the user wants to quickly expose or hide the entire menu screen image 320, he may flick a desired tag by for example interactive with the tag successively (e.g., tapping on the tag), or as shown in FIG. 8, the user may push the tag up or down in a bouncing manner (S106, S107). In order to determine a touch input type (i.e., whether the user means to flick or drag the tag), the controller 180 may use one or more factors associated with user interaction with the tag. These factors may include time, speed, direction, pressure and area to which the touch is applied or released.

Figure 9A:
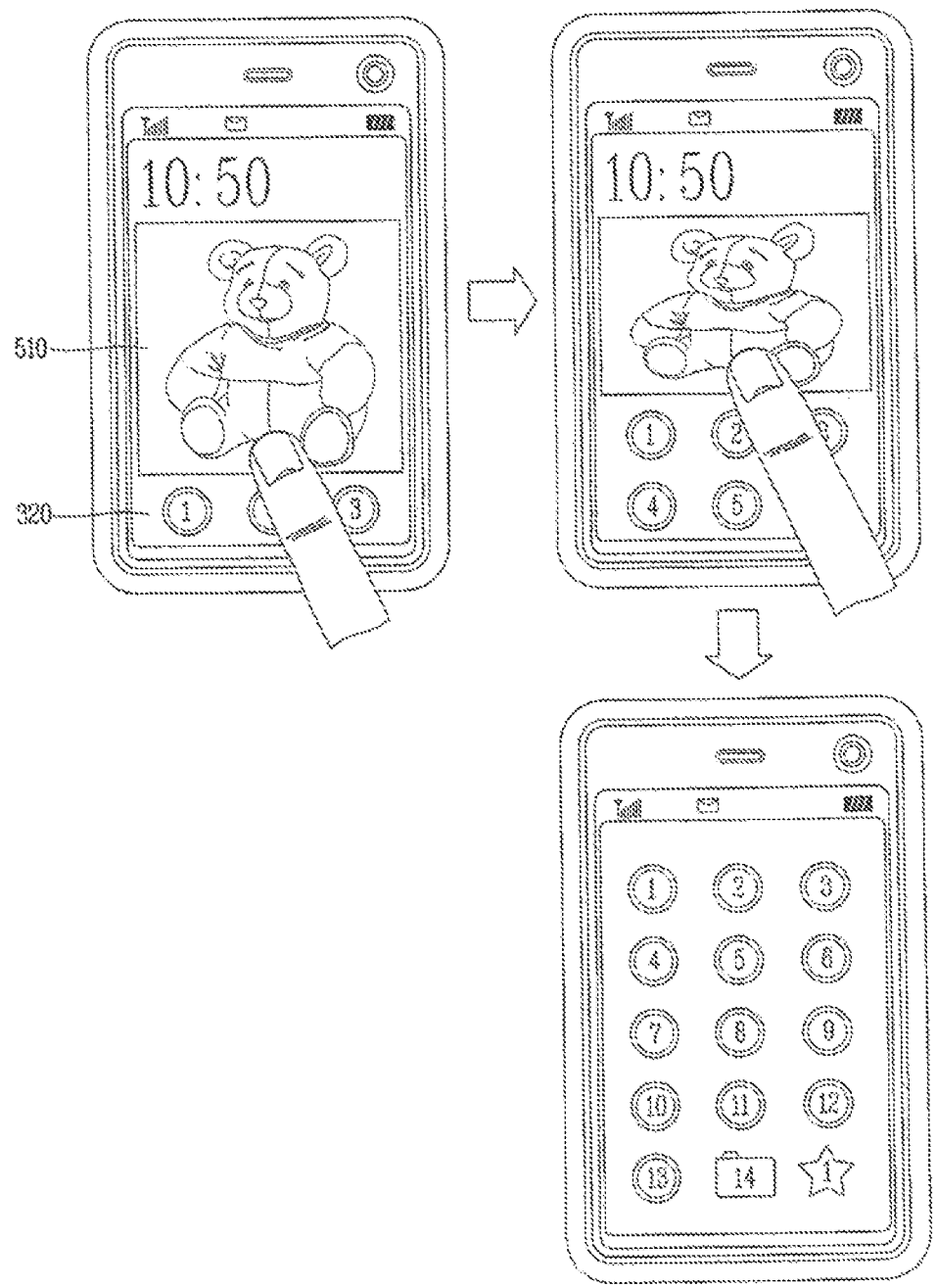
FIGS. 9A to 9E are exemplary views for explaining a method for displaying a menu screen image in a state that an executed screen image is displayed according to one embodiment.

The method for displaying a menu screen image 320 when a screen image executing a particular menu is displayed on a background screen will now be described with reference to FIGS. 9A to 9E. As shown in FIG. 9A, if it is assumed that a particular menu has been already executed and the corresponding execution screen image 510 is displayed on the background screen image 310, if the region of the exposed menu screen increases, the size of the region where the executed screen image 510 is displayed would be reduced inverse-proportionally. For example, if the menu screen image 320 is dragged to appear in a state that a video reproduction image has been displayed, the region of the exposed menu screen image 320 is gradually increased while the size of region where the video reproduction image is displayed is gradually reduced.

Figure 9B:
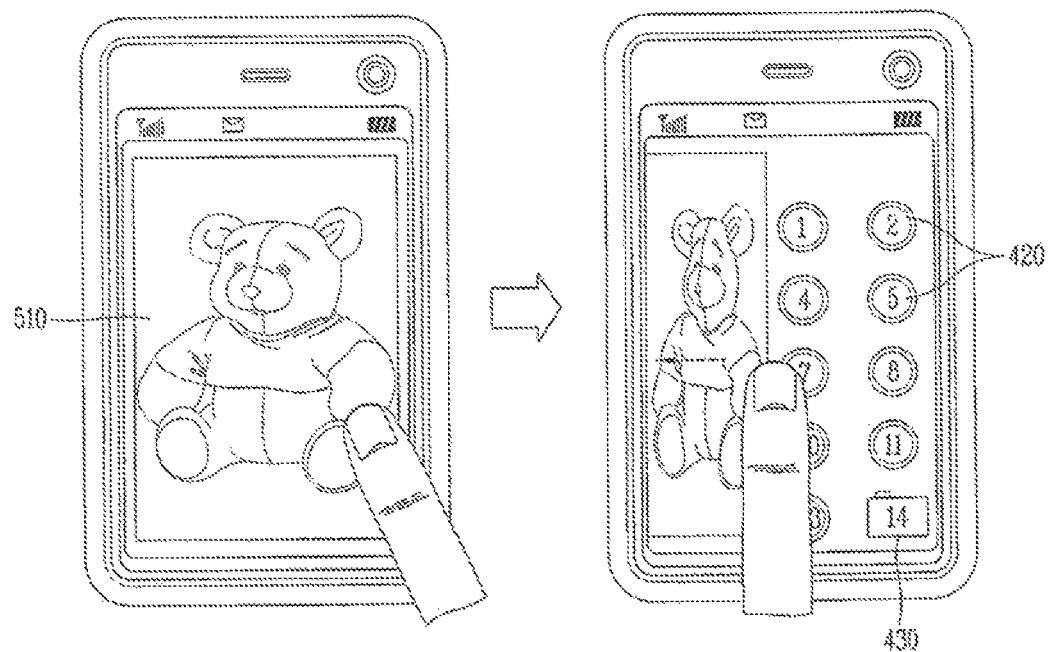
Figure 9C:
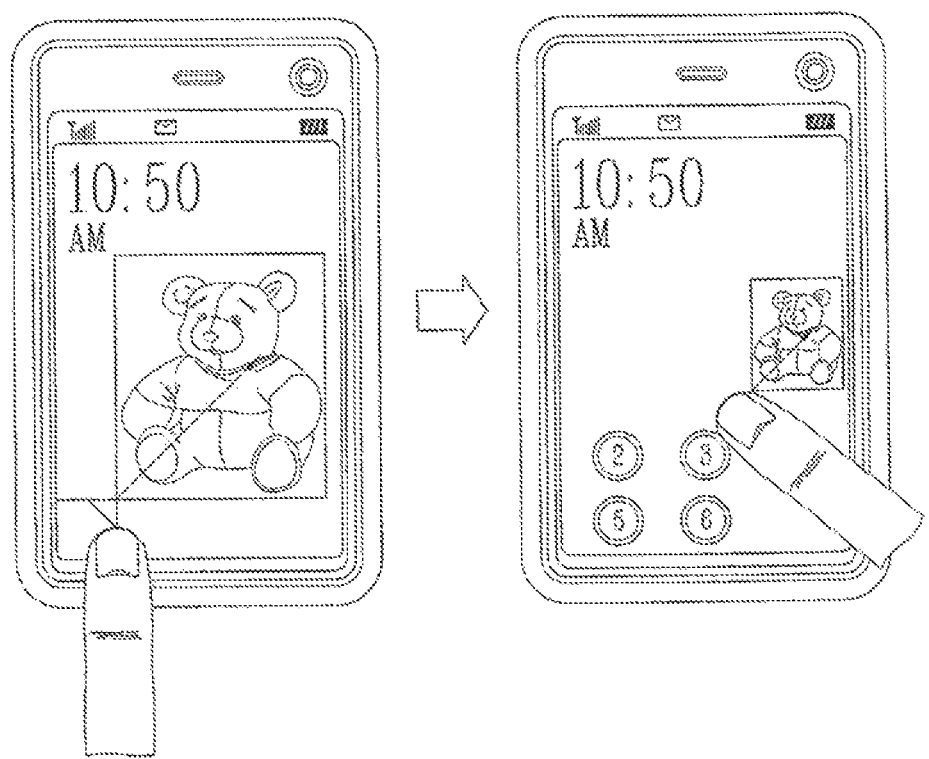
Figure 9D:
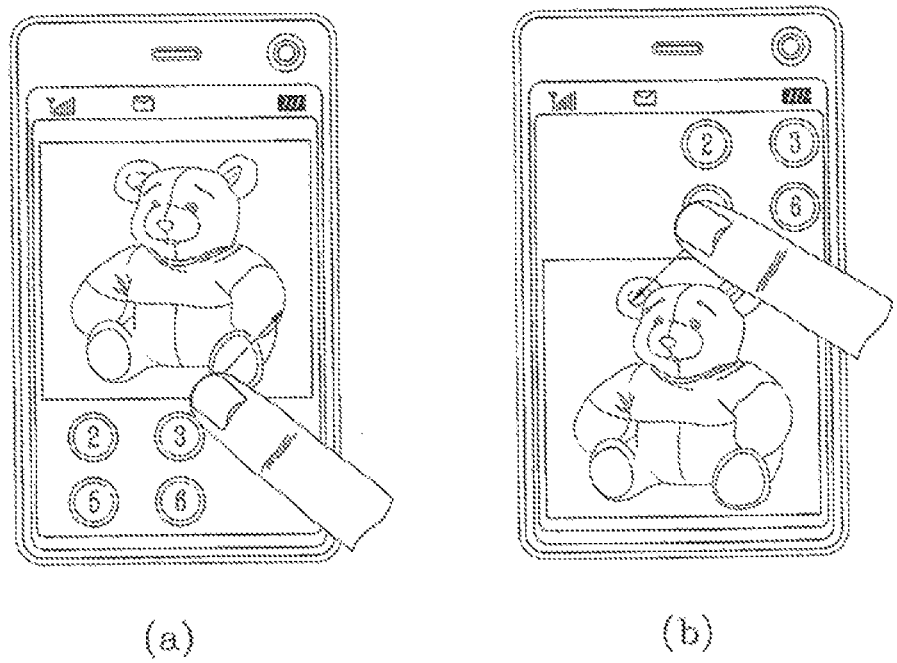

A display position of the re-sized executed screen image 510 may vary according to a direction in which the menu screen image 320 is dragged. For example, as shown in FIG. 9A, when the menu screen image 320 is dragged in a downward direction, the re-sized executed screen image 510 may be displayed at an upper portion. As shown in FIG. 9B, if the menu screen image 320 is dragged from the right side, it may be displayed at the left portion. In addition, as shown in FIG. 9C, if the menu screen image 320 is dragged from one corner portion, the executed screen image 510 may be displayed at a corner potion of its opposite side. As shown in FIG. 9D, even if the menu screen image 320 is dragged from one corner portion, the executed screen image 510 may be displayed at up/down portion (a) or left/right portion (b).

With reference to FIGS. 9A and 9C, the re-sizing method of the executed screen image 510 may vary according to the direction in which the menu screen image 320 is dragged. For example, if the menu screen image 320 is dragged in an upward direction or in a downward direction, the length of the vertical direction (up/down direction) of the executed screen image 510 is adjusted while the length of the horizontal direction of the executed screen image 510 is maintained. If the menu screen image 320 is dragged in a left direction or in a right direction, the length of the horizontal direction (left/right direction) of the executed screen image 510 is adjusted while the length of the vertical direction of the executed screen image 510 is maintained. If the menu screen image 320 is dragged from a corner portion, the both lengths of the horizontal and vertical directions of the executed screen image 510 can be adjusted.

Figure 9E:
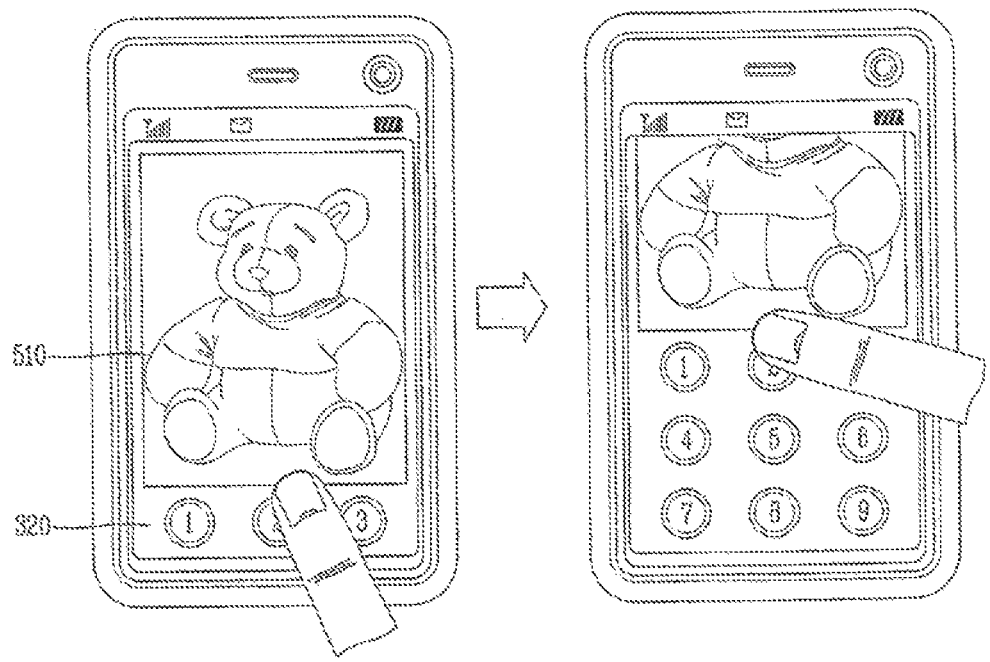

Instead of adjusting the size of the executed screen image 510 according to an environment setting option, a portion of the region where the executed screen image 510 like the menu screen image 320 is displayed may be allowed to appear or be hidden as shown in FIG. 9E. Namely, as the exposure region of the menu screen image 320 increases, the exposure region of the executed screen image 510 may be reduced inverse-proportionally. Also, as the exposure region of the menu screen image 320 is reduced, the exposure region of the executed screen image 510 may be increased inverse-proportionally.

The controller 180 controls the operation of resizing or exposing/hiding the executed screen image 510 according to an exposing/hiding operation of the menu screen image 320.

In the above description, tags 410 are displayed on the menu screen image 320 and a desired tag being displayed is touched to be dragged or flicked to display a menu screen image 320. However, even without tags 410 for controlling display of the menu screen image 320, the above-described menu screen display function may be executed when the background screen image 310 is touched for a particular time period and then dragged or flicked. In this case, a touch unit for touching, dragging and flicking may be the user's finger or a stylus, or any other means that have not been mentioned.

Figure 10B:
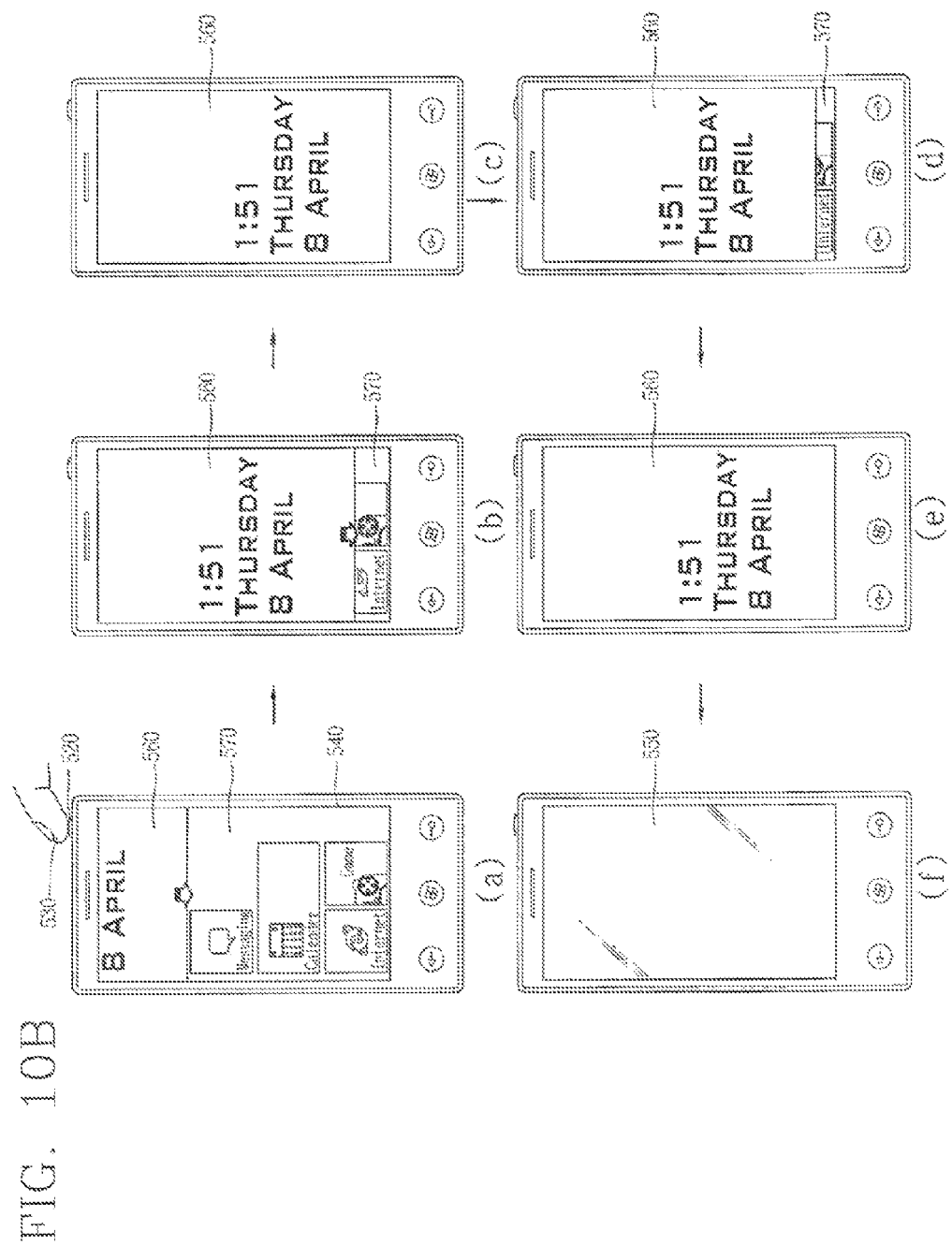
FIGS. 10A and 10E are exemplary views of a mobile terminal displaying a lock mode screen in a bouncing animation according to one embodiment.
Figure 10C:
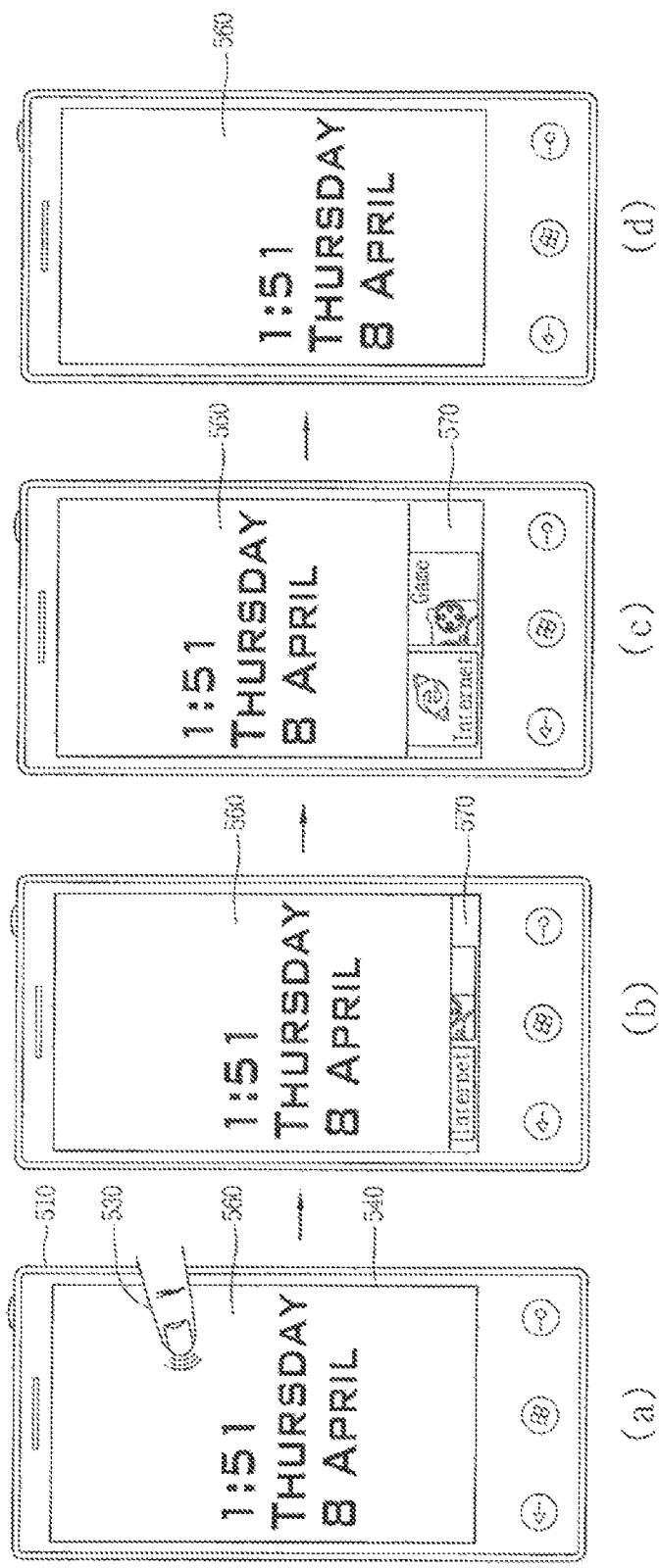
Figure 10E:
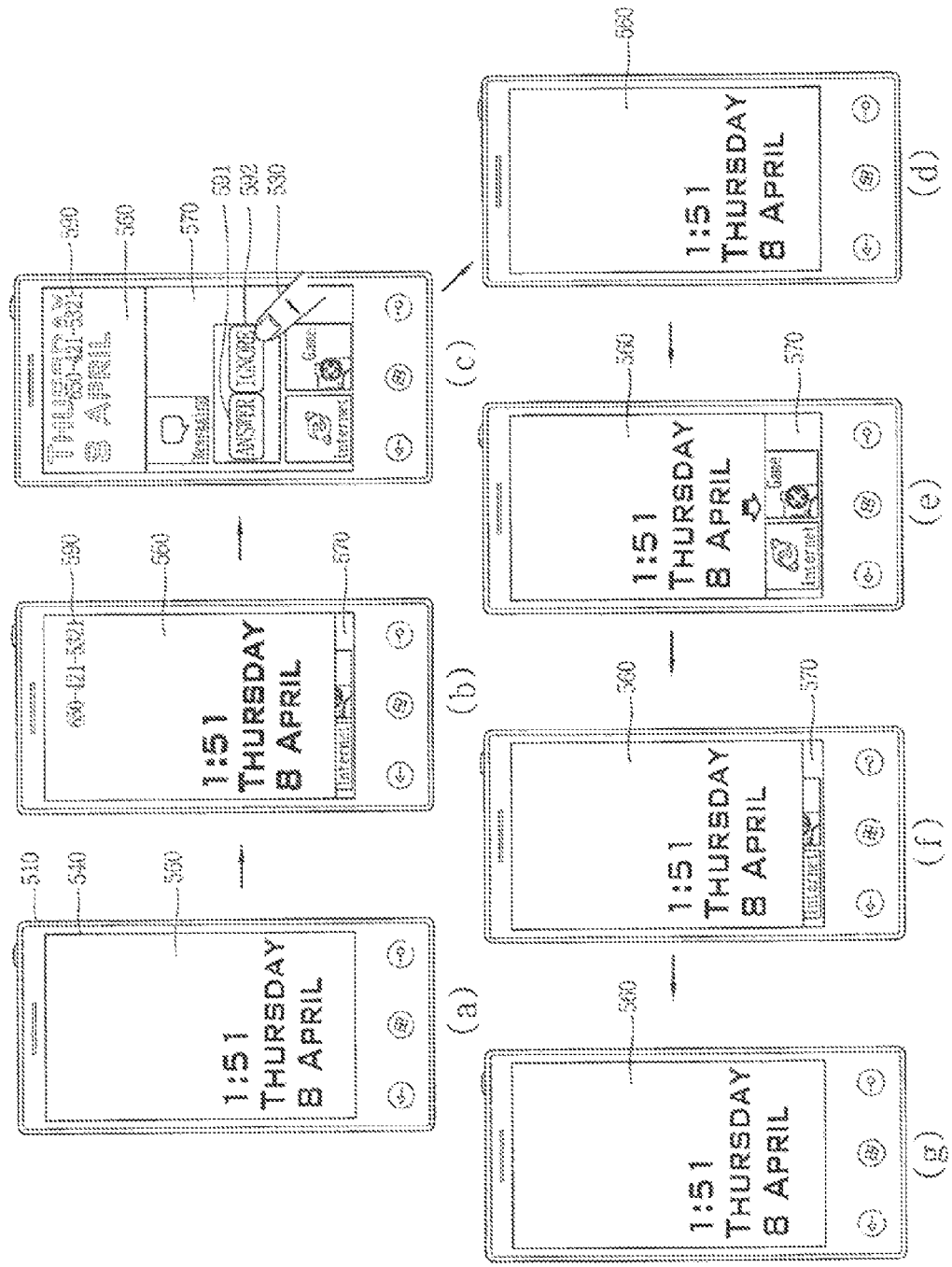

FIGS. 10A and 10E are exemplary views of a mobile terminal 510 displaying a lock mode screen 560 in a bouncing animation according to one embodiment. In FIGS. 10A and 10B, the mobile terminal 510 (e.g., a mobile phone, a tablet TV, a laptop, etc.) comprises a display module 540 and an input device (e.g., which may be a part of the manipulating unit 130, such as a touch pad) configured to detect an input for triggering the bouncing animation of the lock mode screen 560. It is appreciated that the display module 540 is an exemplary embodiment of the display unit 151 in FIG. 1. The mobile terminal 510 further comprises the controller (180) configured to cause the display module 540 to display the bouncing animation in response to the input for triggering the bouncing animation, where the bouncing animation comprises the lock mode screen 560 bouncing for a set number of times with respect to an edge (e.g., a bottom edge) of the display module 540 prior to stabilization. As described in FIG. 1, when the display module 540 and the input device are overlaid in a layered manner to form a touch screen, the display module 540 may function as both an input device and an output device.

FIG. 10A illustrates a process of displaying the lock mode screen 560 in the bouncing animation upon pressing a hard key 520 to convert from a suspend mode screen 550 to the lock mode screen 560. In FIG. 10A, the input device configured to detect the input for triggering the bouncing animation of the lock mode screen 560 comprises the hard key 520. In process (a) of FIG. 10A, the hard key 520 is pressed by a user 530 (e.g., a finger of the user 530) to convert the mobile terminal 510 in the suspend mode screen 550 (e.g., a sleep mode screen where the LCD or other lighting element for the display module 540 is off) into the lock mode screen 560 (e.g., a suspend mode screen or a sleep mode screen) In one example embodiment, the lock mode screen 560 is a lock screen or a screensaver.

In process (b), the lock mode screen 560 moves upward to expose an active mode screen 570 (e.g., or a play mode screen) underneath the lock mode screen 560, where the active mode screen 570 may comprise one or more icons representing applications, widgets, or contents. In process (c), the lock mode screen 560 moves even further from the bottom edge of the display module 540 such that more of the active mode screen 570 is exposed. This may allow the user 530 to take a peek at the layout detail of the active mode screen 570. In process (d), the lock mode screen 560 is dropped to the bottom of the display module 540 such that the active mode screen 570 is no longer available for peeking.

Although FIG. 10A illustrates the bouncing animation where the lock mode screen 560 moves up and down once, in one exemplary implementation, the controller 180 is configured to have the lock mode screen 560 to bounce more than two times. Further, in another exemplary implementation, the controller 180 is configured to cause the display module 540 to perform the bouncing of the lock mode screen 560 in a certain speed (e.g., 2 seconds to complete a single bounce). In yet another exemplary implementation, the controller 180 is configured to have the lock mode screen 560 to move in different heights as multiple bounces of the lock mode screen 560 are performed. For example, the first bounce may be one millimeter in height from the bottom of the display module 540, the second bounce two millimeters in height from the bottom, and the third bounce three millimeters in height from the bottom followed by the fourth bounce two millimeters in height from the bottom and the fifth bounce one millimeter in height from the bottom until the lock mode screen 560 comes to rest.

FIG. 10B illustrates a process of displaying the lock mode screen 560 in the bouncing animation upon pressing a hard key 520 to convert the mobile terminal 510 from the active mode screen 570 to the lock mode screen 560. In process (a) of FIG. 10B, the hard key 520 is pressed by the user 530 to convert the mobile terminal 510 in the active mode screen 570 into the lock mode screen 560. In process (b), the lock mode screen 560 moves downward to hide the active mode screen 570. It is appreciated that there may be a brief period of a pause mode screen between the active mode screen 570 in process (a) and the lock mode screen 560 in process (b). In process (c), the lock mode screen 560 is dropped to the bottom of the display module 540 such that the active mode screen 570 is no longer available for peeking.

In process (d), the lock mode screen 560 bounces upward in a preconfigured height to expose a bottom portion of the active mode screen 570. In process (e), the lock mode screen 560 is dropped to the bottom of the display module 540 such that the active mode screen 570 is no longer available for peeking In process (f), when there is no input registered for the mobile terminal 510 for more than a threshold time (e.g., 30 seconds), the mobile terminal 510 enters into a suspend mode or sleep mode, thus displaying the suspend mode screen 550 on the display module 540. In FIG. 10B, the controller 180 is configured to perform the bouncing animation illustrated in processes (a) through (f) in varying speeds, heights, and number of repetitions.

FIG. 10C illustrates a process of displaying the lock mode screen 560 in the bouncing animation upon tapping the display module 540. In FIG. 10C, the display module 540 and the input device are overlaid in a layered manner to form a touch screen on the mobile terminal 510, so the display module 540 may function as both an input device and an output device. In process (a) of FIG. 10C, the surface of the display module 540 is tapped (e.g., touched or contacted) by the user 530 to trigger the bouncing animation of the lock mode screen 560. In process (b), the lock mode screen 560 moves upward to expose an active mode screen 570, where the active mode screen 570 may comprise one or more icons representing applications, widgets, or contents.

In process (c), the lock mode screen 560 moves even further from the bottom edge of the display module 540 such that more of the active mode screen 570 is exposed. This may allow the user 530 to take a peek at the layout detail of the active mode screen 570. In process (d), the lock mode screen 560 is dropped to the bottom of the display module 540 such that the active mode screen 570 is no longer available for peeking Although FIG. 10C illustrates the bouncing animation where the lock mode screen 560 moves up and down once, the controller 180 may be configured to have the lock mode screen 560 to perform the bouncing animation illustrated in processes (a) through (d) in varying speeds, heights, and number of repetitions. In one embodiment, the number of bounces performed during the bouncing animation is determined by strength of the tap applied to the surface of the display module 540 or touch screen.

FIG. 10D illustrates a process of displaying the lock mode screen 560 in the bouncing animation upon dragging or flicking an edge of the lock mode screen 560. In one embodiment, as illustrated in process (a) of FIG. 10D, the bouncing animation of the lock mode screen 560 is initiated by touching and dragging the lock mode screen 560 by a length. In an alternative embodiment, the bouncing animation of the lock mode screen 560 is initiated by flicking the lock mode screen 560. In yet another alternative embodiment, the dragging of the lock mode screen 560 initiates the bouncing animation, whereas the flicking of the lock mode screen 560 curtains up the lock mode screen 560, thereby exposing the active mode screen 570 underneath the lock mode screen 560 in its entirety. It is appreciated that processes (b) through (h) in FIG. 10D is similar to the bouncing animation illustrated in processes (b) through (d) in FIG. 10A, processes (b) through (e) in FIG. 10B, or processes (b) through (d) in FIG. 10C.

In one embodiment, the controller 180 is configured to perform the bouncing animation illustrated in processes (a) through (h) of FIG. 10D in varying speeds, heights, and number of repetitions. In one embodiment, the number of bounces performed during the bouncing animation is determined by a distance of the dragging of the lock mode screen 560. For instance, as the motion of the dragging covers more length, then there would be more bounces occurring during the performance of the bouncing animation. In another embodiment, the number of bounces performed during the bouncing animation is determined by strength of the flicking applied to the display module 540. For instance, as more force is applied during the flicking motion, there would be more bounces occurring during the performance of the bouncing animation.

Further, in one embodiment, as illustrated in processes (a), (c), (d), and (e), the controller 180 is configured to display the lock mode screen 560 in a different degree of transparency as the lock mode screen 560 is moving along the display module 540. In one example implementation, as the bouncing animation is triggered in process (a), the lock mode screen 560 is opaque where none of the active mode screen 570 is seen through the lock mode screen 560. In process (c), as the lock mode screen 560 moves upward, the lock mode screen 560 become more transparent (e.g., translucent) such that a glimpse of the active mode screen 570 may be seen through the lock mode screen 560 to some degree. Then, in process (d), as the lock mode screen 560 reaches toward the top edge of the display module 540, the lock mode screen 560 may become more transparent such that the active mode screen 570 may be exposed in a greater detail. Further, texts or images 580 present on the lock mode screen 560 may be diluted increasingly as the lock mode screen 560 moves upward toward the edge of the display module 540.

In another example implementation (which is not shown), as the bouncing animation is triggered in process (a), the lock mode screen 560 is opaque throughout the process of the bouncing animation, except when the lock mode screen 560 is hitting the bottom edge of the display module 540 or the touch screen to bounce back. When the lock mode screen 560 (e.g., the lock screen) hits the bottom of the display module 540 to bounce back, the lock mode screen 560 becomes transparent to expose the details of the active mode screen 570. Further, the texts or images 580 present on the lock mode screen 560 may be diluted as the lock mode screen 560 hits the bottom edge of the display module 540.

It is appreciated that the bouncing animation may be performed in any configured direction, although FIG. 10D illustrates the lock mode screen 560 bouncing at the bottom edge of the display module 540. For example, the controller 180 may be configured to display the bouncing animation in such a way that the lock mode screen 560 bouncing at the top of the display module 540 when dragged or flicked from the top to bottom of the display module 540, bouncing at one or both sides of the display module 540 when dragged or flicked from the opposite side of the display module 540, or bouncing at one corner of the display module 540 when dragged or flicked from the diagonally opposite corner of the display module 540.

FIG. 10E illustrates a process of displaying the lock mode screen 560 in the bouncing animation upon receiving an incoming call. In one embodiment, as illustrated in process (b) of FIG. 10E, the bouncing animation of the lock mode screen 560 is initiated upon receiving an incoming call or an incoming message (e.g., a text message, a video message, an audio message, or a multi-media message). Upon receiving the incoming call, a caller identification (ID) 590 is displayed on the display module 540, and the lock mode screen 560 moves upward to expose the active mode screen 570 underneath it. In process (c), the controller 180 is configured to display a first soft key for answering the incoming call 591 (e.g., "answer") and a second soft key for ignoring the incoming call (e.g., "ignore") on the active mode screen 570 underneath the lock mode screen 560.

In one example implementation, when the incoming call is answered by pressing the first soft key for answering the incoming call 591, the lock mode screen 560 is cleared, thus making a way for the active mode screen 570. In another example implementation, when the incoming call is ignored by pressing the second soft key for ignoring the incoming call 592, the bouncing animation of the lock mode screen 560 is initiated in response to a signal indicating a selection of the second soft key 592.

In one embodiment, the controller 180 is configured to perform the bouncing animation illustrated in processes (a) through (g) of FIG. 10E in varying speeds, heights, and number of repetitions in response to the selection of the second soft key 592. In one embodiment, the number of bounces performed during the bouncing animation may be determined by a duration of the ringing of the incoming call. For instance, if the incoming call continues ringing without any response registered to the mobile terminal 510, the bouncing animation is continuously performed until one of the soft keys is pressed.

Further, in one embodiment, as illustrated in processes (a) through (d), the controller 180 is configured to display the lock mode screen 560 in a different degree of transparency as the lock mode screen 560 is moving along the display module 540. For example, as the bouncing animation is triggered in process (a), the lock mode screen 560 is opaque where none of the active mode screen 570 is seen through the lock mode screen 560. In process (b), as the lock mode screen 560 moves upward, the lock mode screen 560 becomes more transparent (e.g., translucent) such that a glimpse of the active mode screen 570 may be seen through the lock mode screen 560 to some degree. Then, in process (c), as the lock mode screen 560 reaches toward the top edge of the display module 540, the lock mode screen 560 may become even more transparent such that the active mode screen 570 may be seen through the lock mode screen 560 in even more details. Further, the texts or images 580 present on the lock mode screen 560 may be diluted increasingly as the lock mode screen 560 moves upward toward the edge of the display module 540. It is appreciated that exemplary processes illustrated in 10A to 10E with respect to the bouncing animation of the lock mode screen 560 (e.g., the lock screen) may provide an aesthetic view of the lock mode screen 560 implemented on the mobile terminal 510.

Figure 11B:
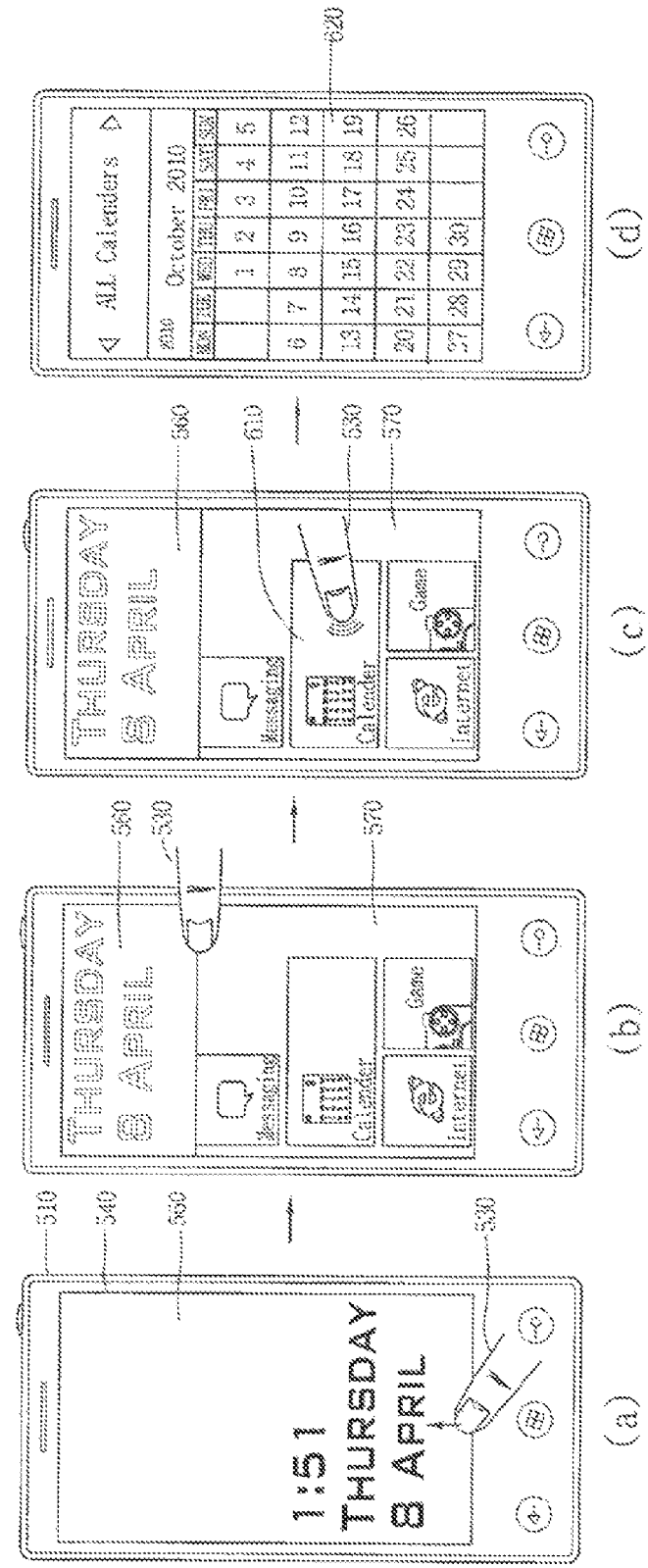

FIGS. 11A and 11B are exemplary views for executing an application during a lock mode or locked screen mode of a mobile terminal according to one embodiment. More particularly, FIG. 11A illustrates an exemplary view of the mobile terminal 510 executing an application on the active mode screen 570 while the lock mode screen 560 (e.g., the lock screen) is still active. When the user 530 touches (e.g., flicks or drags) the display module 540 using the user's finger or a stylus as shown in process (a), the lock mode screen 560 moves (e.g., slides or glides) up toward the top edge of the mobile terminal 510 as illustrated in process (b).

In process (b), while the lock mode screen 560 is open enough to expose some of the applications, widgets, or contents available on the active mode screen 570, the user 530 may select one of the applications, widgets, or contents. For example, in process (b), the user 530 selects a calendar 610 (e.g., an application or a widget) on the active mode screen 570 by making a contact with the icon representing the calendar 610. In process (b), the lock mode screen 560 becomes more transparent as it moves towards the edge of the display module 540, and the text or image 580 on the lock mode screen 560 becomes increasingly diluted in the process. Process (c) illustrates an executed view of the calendar 620. In one embodiment, once the calendar 610 is deactivated and there is no further input to the active mode screen 570 for more than a threshold time (e.g., 30 seconds), the controller 180 is configured to execute the bouncing animation of the lock mode screen 560 as the mode of the mobile terminal 510 is transformed from the active mode to the lock mode.

FIG. 11B illustrates an exemplary view of the mobile terminal 510 executing an application on the active mode screen 570 while the lock mode screen 560 (e.g., the lock screen) is temporarily stopped. In process (a) of FIG. 11B, when the user 530 touches (e.g., flicks or drags) the display module 540 using the user's finger or stylus as shown in process (a), the lock mode screen 560 moves (e.g., slides or glides) up toward the top edge of the mobile terminal 510.

In process (b), when the lock mode screen 560 is open enough to expose some of the applications, widgets, or contents available on the active mode screen 570, the user 530 may stop the movement of the lock mode screen 560 by pressing the bottom edge of the lock mode screen 560. Then, the user 530 may select one of the applications, widgets, or contents available on the active mode screen 570. For example, in process (c), the user 530 selects the calendar 610 (e.g., an application or a widget) on the active mode screen 570 by making a contact with the icon representing the calendar 610. Process (d) illustrates the executed view of the calendar 620. Then once the calendar 610 is deactivated and there is no further input to the active mode screen 570 for more than a threshold time (e.g., 30 seconds), the controller 180 is configured to execute the bouncing animation of the lock mode screen 560 while the mode of the mobile terminal 510 is transformed from the active mode to the lock mode.

Figure 12:
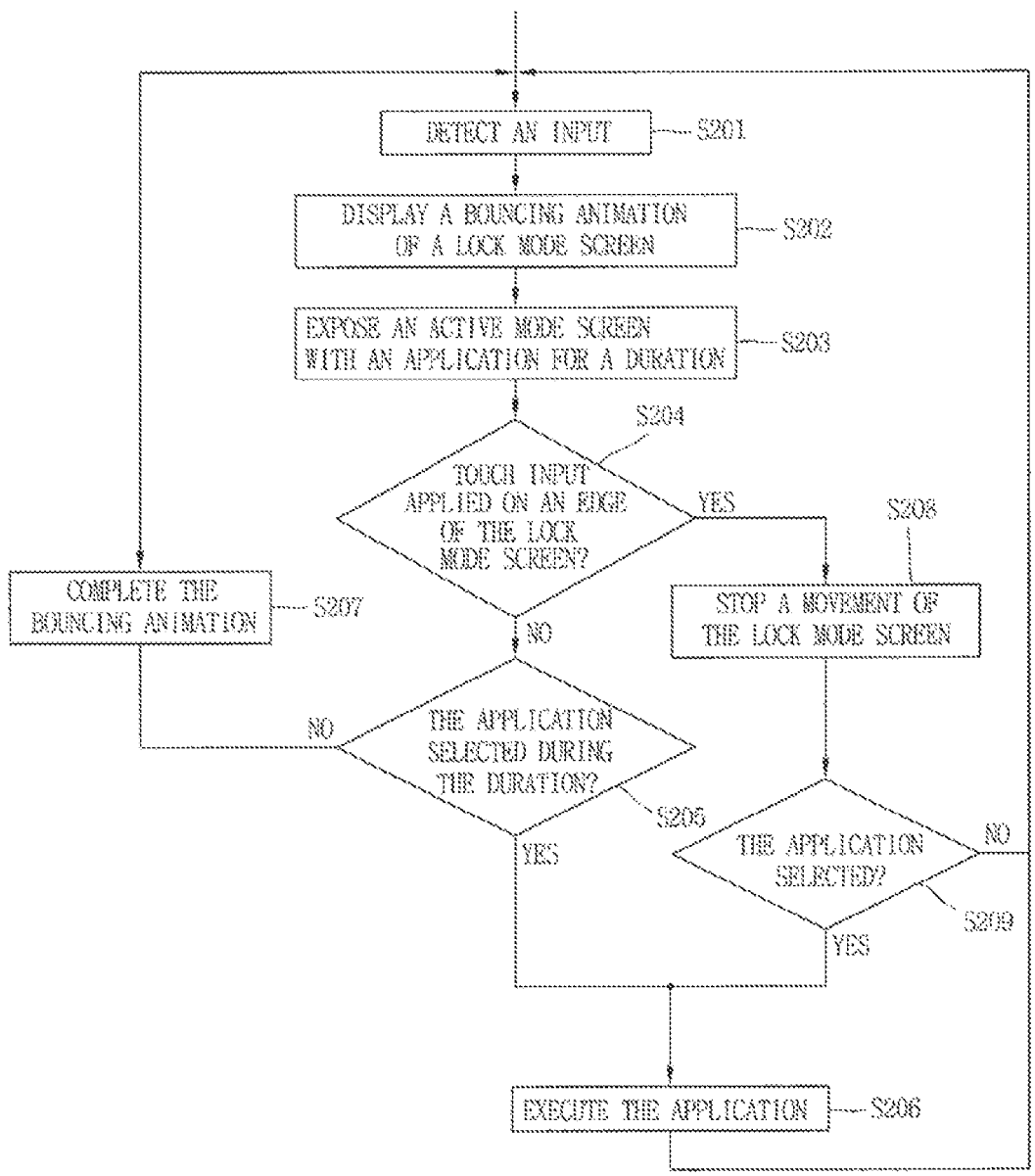
FIG. 12 is a flow chart illustrating a process of displaying a lock mode screen in a bouncing animation according to one embodiment.

FIG. 12 is a flow chart illustrating a process of displaying a lock mode screen in a bouncing animation according to one embodiment. The method of displaying the lock mode screen in the bouncing animation is now described with reference to FIGS. 10A, 10C, 10D, 11A, and 11B. In process (a) of FIGS. 10A, 10C, and 10D, the bouncing animation of the lock mode screen 560 is initiated as the input triggering the bouncing animation is detected (step 201). Then the bouncing animation of the lock mode screen 560 is displayed (step 202) as in process (b) of FIGS. 10A, 10C, and 10D. In process (c) of FIGS. 10A and 10C and in process (d) of FIG. 10D, the active mode screen 570 with one or more applications are exposed (step 203) underneath the lock mode screen 560.

In FIG. 12, if there is no touch input applied (step 204) and no application selected during the exposure of the active mode screen 570 (step 205), then the bouncing animation continues until its completion (step 207) as illustrated in process (d) of FIGS. 10A and 10C and process (h) in FIG. 10D. If a touch input applied on an edge of the lock mode screen 560 is detected (step 204), as illustrated in process (b) of FIG. 11B, then the movement of the lock mode screen 560 is stopped (step 208) to give the user 530 time to select any application on the active mode screen 570 available for access. Then, when the application is selected by the user 530, the application is executed (step 206). However, if there is no touch input applied on the edge of the lock mode screen 560, but the application is selected by the user 530 while the application on the active mode screen 570 is available for selection underneath the lock mode screen 560, the application is executed (step 206).

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a touch screen; and
a controller configured to:
cause displaying of a lock screen on the touch screen;
cause displaying of at least a portion of an active screen on the touch screen in response to a dragging of the lock screen;
change a degree of a transparency of text on the lock screen according to the dragging such that the text is displayed in at least two different degrees of transparency; and
cause displaying of a bouncing animation of the lock screen after the dragging such that the lock screen bounces multiple times against a single edge of the touch screen according to a set number of times.

2. The mobile terminal of claim 1, wherein the controller is further configured to cause the displaying of the bouncing animation in response to tapping on the lock screen.

3. The mobile terminal of claim 1, further comprising a wireless communication unit, wherein the wireless communication unit is configured to receive an incoming call.

4. The mobile terminal of claim 3, wherein the controller is further configured to cause displaying of a first soft key for answering incoming call and a second soft key for ignoring the incoming call on the active screen which is laid underneath the lock screen.

5. The mobile terminal of claim 4, wherein the controller is further configured to repeat the bouncing animation in response to a signal indicating a selection of the second soft key.

6. The mobile terminal of claim 1, wherein the controller is further configured to stop the bouncing of the lock screen in response to a touch applied during the bouncing animation to an area on the touch screen which corresponds to an edge of the lock screen.

7. A method for displaying a lock mode screen of a mobile terminal comprising a touch screen, the method comprising:
displaying the lock screen on the touch screen;

displaying at least a portion of an active screen on the touch screen in response to a dragging of the lock screen;

changing a degree of a transparency of text on in the lock screen according to a the dragging such that the text is displayed in at least two different degrees of transparency; and displaying a bouncing animation of the lock screen on the touch screen after the dragging, such that the lock screen bounces multiple times against a single edge of the touch screen according to a set number of times.

8. The method of claim 7, further comprising moving the lock screen in response to an additional input applied to the input device of the mobile terminal to expose the active screen of the mobile terminal which is laid underneath the lock screen, wherein the active screen comprises an icon representing an application.

9. The method of claim 8, further comprising executing the application in response to a selection of the icon representing the application.

10. The method of claim 8, further comprising stopping the bouncing of the lock screen in response to a touch input applied during the bouncing animation to an edge of the lock screen.

11. The method of claim 10, further comprising executing the application in response to a selection of the icon representing the application.

12. A non-transitory computer readable storage medium having a processing program stored thereon, wherein the processing program is configured to operate a processor of a mobile terminal to perform:

displaying a lock screen on a touch screen of the mobile terminal;

displaying at least a portion of an active screen on the touch screen in response to a dragging of the lock screen;

changing a degree of a transparency of text on the lock screen according to the dragging such that the text is displayed in at least two different degrees of transparency; and displaying a bouncing animation of the lock screen after the dragging, such that the lock screen bounces multiple times against a single edge of the touch screen according to a set number of times.

13. A mobile terminal comprising:
a touch screen; and
a controller configured to:
cause the touch screen to display a lock screen comprising at least one visual object, wherein the lock screen hides an active screen comprising at least one icon representing at least one application, widget, or content behind the lock screen;
move the displayed lock screen upward in response to a single touch and moving input applied to the lock screen in an upward direction, wherein as the lock screen moves more upward, the at least one visual object becomes more transparent such as that the at least one visual object is displayed in at least two different degrees of transparency and the active screen is increasingly exposed during the upward movement of the lock screen; and
bounce the lock screen multiple times against a bottom edge of the touch screen according to a set number of times moved lock screen is released from the touch.

14. The mobile terminal of claim 13, wherein the lock screen moves in different heights as the lock screen bounces for the multiple times.

15. The mobile terminal of claim 13, wherein the lock screen is, configured to bounce at least twice, and a height of a first bouncing of the lock screen is higher than a height of a second bouncing of the lock screen.

16. The mobile terminal of claim 13, wherein the visual object comprises a text.

17. The mobile terminal of claim 13, wherein the touch and moving input comprises a drag input.

18. A method of a mobile terminal comprising a touch screen, the method comprises:

displaying a lock screen comprising a visual object on the touch screen, wherein the lock screen hides an active screen comprising at least one icon representing at least one application, widget, or content behind the lock screen;

moving the lock screen upward in response to a single touch and moving input applied to the lock screen in an upward direction, wherein as the lock screen moves more upward, the visual object becomes more transparent such that the at least one visual object is displayed in at least two different degrees of transparency and the active screen is increasingly exposed during the upward movement of the lock screen; and bouncing the lock screen multiple times against a bottom edge of the touch screen according to a set number of times moved lock screen is released from the touch.

19. The method of claim 18, wherein the lock screen moves in different heights as the lock screen bounces for the multiple times.

20. The method of claim 18, further comprising executing an application of the at least one application in response to a selection of an icon representing the application.

21. The mobile terminal of claim 1, wherein the lock screen is moved in a different height time the lock screen is bounced during the bouncing animation.

22. A mobile terminal comprising:
a touch screen configured to receive a first input for triggering a bouncing animation of a lock screen;
an input unit configured to receive a second input for triggering the bouncing animation of the lock screen, the input unit excluding the touch screen; and
a controller configured to:
cause displaying of the lock screen on the touch screen; and
cause displaying of the bouncing animation on the touch screen in response to the first or second input,
wherein the bouncing animation comprises the lock screen bouncing multiple times against a single edge of the touch screen according to a set number of times, and
wherein the first input comprises a dragging of the lock screen such that a degree of a transparency of text included in the lock screen is changed incrementally as the lock screen is moved farther from an origin of the dragging such that the text is displayed in at least two different degrees of transparency, and the bouncing animation is initiated in response to the dragging.

23. The mobile terminal of claim 22, wherein the second input is received via the unit positioned at a portion of a case of the mobile terminal.

24. The mobile terminal of claim 2, wherein the set number of times is different based on whether the bouncing animation is initiated in response to the dragging or the tapping.

25. The mobile terminal of claim 1, wherein the controller is further configured to cause the lock screen to move in different heights as the lock screen bounces for the multiple times.

26. The mobile terminal of claim 1, wherein:
the controller is further configured to cause the lock screen to bounce at least twice; and a height of a first bouncing of the lock screen is higher than a height of a second bouncing of the lock screen.

* * * * *